(12) United States Patent
Gendler et al.

(10) Patent No.: US 12,524,344 B1
(45) Date of Patent: Jan. 13, 2026

(54) CACHE WRITEBACK CIRCUIT

(71) Applicant: Apple Inc., Cupertino, CA (US)

(72) Inventors: Alexander Gendler, Kiriat Ata (IL);
Ilya Granovsky, Kiryat Tivon (IL);
Idan Mondjak Kedem, Kfar Saba (IL);
Or Davidi, Modi'in (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/891,497

(22) Filed: Sep. 20, 2024

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC .................................................. G06F 12/0802
See application file for complete search history.

(56) References Cited

U.S. PATENT DOCUMENTS

| | | | |
|---|---|---|---|
| 10,210,092 B1 | 2/2019 | Miao et al. | |
| 11,501,024 B2 | 11/2022 | Anderson et al. | |
| 11,520,706 B2 | 12/2022 | Artieri et al. | |
| 11,899,575 B1 | 2/2024 | Kuzmin et al. | |
| 2005/0044320 A1* | 2/2005 | Olukotun | G06F 15/7846 712/E9.046 |
| 2018/0285268 A1 | 10/2018 | Korgaonkar et al. | |
| 2019/0286567 A1 | 9/2019 | Chaudhuri et al. | |

FOREIGN PATENT DOCUMENTS

| | | |
|---|---|---|
| CN | 102207909 A | 10/2011 |
| CN | 104375957 A | 2/2015 |
| CN | 104915150 A | 9/2015 |
| CN | 112395221 A | 2/2021 |

* cited by examiner

*Primary Examiner* — Jae U Yu
(74) *Attorney, Agent, or Firm* — Kowert, Hood, Munyon, Rankin & Goetzel, P.C.; Dean M. Munyon

(57) ABSTRACT

A cache writeback circuit is disclosed for writing back, without invalidating, dirty cache lines. The cache writeback circuit is configured to enter an active state based on detecting a trigger condition indicative of cache misses to a memory cache circuit within a memory hierarchy of a computer memory subsystem causing cache line eviction activity. During the active state, the cache writeback circuit is configured to identify a set of dirty cache lines in the memory cache circuit, and write back, without invalidating, cache lines of the identified set of dirty cache lines from the memory cache circuit to a memory circuit within a lower level of the memory hierarchy, such as DRAM. The cache writeback circuit may further be configured to identify the dirty cache lines via a cache walk operation, which can be suspended, for example, when a higher-priority cache operation occurs.

20 Claims, 24 Drawing Sheets

CACHE WRITEBACK CIRCUIT

BACKGROUND

Technical Field

This application relates generally to computer systems, and more specifically to cache circuits within memory subsystems of such computer systems.

Description of the Related Art

Memory within computer memory subsystems is commonly organized according to a hierarchy in which different levels differ based on speed, size, and cost. Caches—relatively small, high-speed memory units that store copies of frequently accessed data—are one common component of such memory hierarchies. Caches typically store data in blocks called cache lines, which are typically aligned with the memory addresses of the data they contain. When a circuit requests a block of data, the cache checks if the data is already stored in one of its cache lines. If it is, the data can be quickly provided to the circuit without having to retrieve it from a lower level of the memory hierarchy (e.g., main memory in one embodiment, which is commonly comprised of volatile memory such as Dynamic Random Access Memory (DRAM)). A given computer system may have multiple caches at various levels of the memory hierarchy—e.g., a Level 1 (L1) cache, a Level 2 (L2) cache, etc. Additionally, a computer system may have multiple ones of a given type of cache—e.g., multiple L1 caches for different processor cores.

Metadata is used to keep track of the status of each cache line in a computer cache. One common type of metadata is a "valid" bit, which indicates whether the cache line includes valid data. Another type of metadata is a "dirty" bit, which indicates that the data in the cache line has been modified and is different from other copies of the cache line stored elsewhere in the computer system. When a cache line is marked as dirty, it means that the data in the cache needs to be written back to a backing memory at some point to ensure that copies of the data remain consistent throughout the system. This process helps to prevent data corruption and ensure the integrity of data stored by the computer system.

DETAILED DESCRIPTION

The present inventors have observed scenarios in computer systems in which a burst of memory access requests received at a memory cache circuit generates misses when the requested data is not located in the memory cache circuit. In certain situations, such as when the cache is at or near capacity and includes a significant amount of dirty data, the received memory access requests can also cause a corresponding burst of evictions as dirty data is written back to a next lower level of the memory hierarchy to make room for the data from the memory access requests.

Consider a scenario in which a memory cache circuit that is one level above system memory DRAM receives a burst of reads from an agent circuit such as a graphics processing unit (GPU), with two resulting effects. First, this burst of reads includes a significant number of cache misses, which causes read requests to be sent to DRAM. Second, the read misses also cause a significant number of evictions of dirty data from the cache, which need to be written to DRAM. The present inventors have observed that in some cases the burst of dirty evictions to DRAM caused by the burst of reads can compete with the read requests themselves for memory bandwidth, since part of the memory bandwidth will go to servicing the cache miss requests, while another part of the memory bandwidth will go to servicing the dirty evictions. It has been observed that this scenario results in a performance reduction for the requesting circuit (here, the GPU) due to the decreased available memory bandwidth.

Figure 1A:
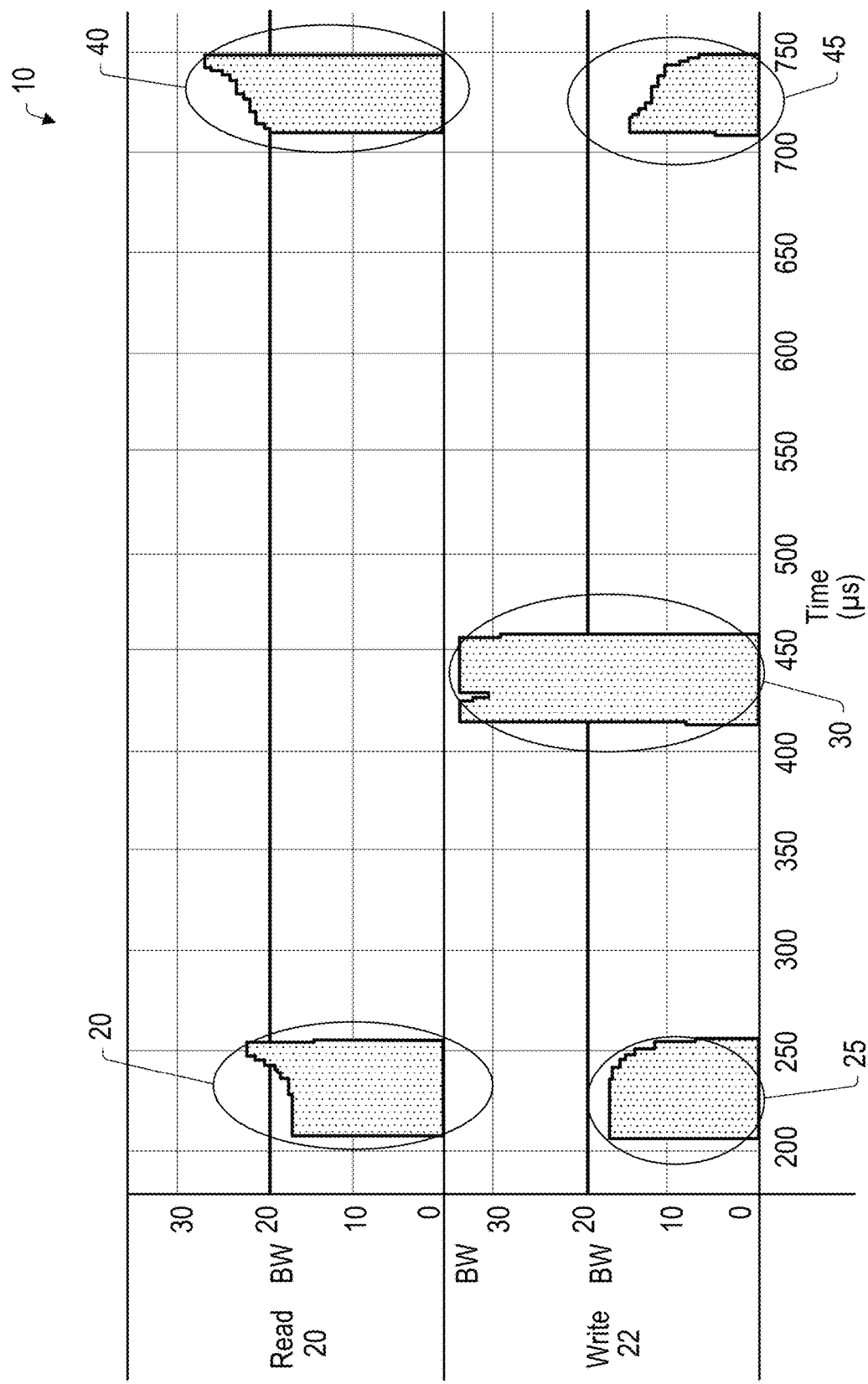
FIG. 1A is diagram illustrating memory activity with read and write contention in a computer system that does not use a cache writeback circuit as disclosed herein.

This problem is illustrated in FIG. 1A. The x-axis of graph 10 is time, while the y-axis is read and write bandwidth (shown stacked on top of one another). Bandwidth is expressed in terms of a percentage of a maximum bandwidth.

DRAM accesses caused by a read burst (e.g., from system agent circuits such as GPUs) is illustrated by reference numeral 20 beginning shortly after 200 μs. Read burst 20 also causes a burst of evictions of dirty data, as indicated by reference numeral 25. Reference numeral 30 is indicative of system write traffic that occurs in between write bursts, shortly after 400 μs. A read burst from the system agent circuits repeats shortly after 700 μs, with DRAM bandwidth being split between read accesses to service the cache misses caused by the read requests (reference numeral 40) and evictions of dirty data caused by these read requests (reference numeral 45).

Note that a similar contention scenario can also occur if read burst 20 is replaced with a corresponding write burst that also causes cache misses. Accordingly, even though FIG. 1A is described from the perspective of a read miss, it is to be understood that the teachings of this disclosure are directed to ameliorating problems stemming from cache misses generally, whether originating from a group of reads or a group of writes.

Having observed the scenario depicted in FIG. 1A and the effect on memory bandwidth, the present inventors propose to separate in time the read bursts and the dirty data evictions between the memory cache circuit and the next lower level of the memory hierarchy. By doing so, the agent circuit (e.g., GPU) will have more memory bandwidth, thus improving system performance. A cache writeback circuit is proposed herein that causes dirty data to be written back to a memory circuit before a memory burst is received. In this manner, the memory cache circuit is kept clean and is thus able to "absorb" the burst of data without causing bandwidth contention for the memory circuit. In various embodiments, the cache writeback circuit causes cache lines with dirty data to be written back to the memory circuit when demand for the memory circuit is low. The cache lines are not invalidated by the cache writeback circuit; the data that remains in the cache is therefore no longer designated as dirty. In one embodiment, the scrubbed data may be designated as clean, or exclusive (e.g., not modified, but modifiable without coherence activity). In any event, the new designation of the scrubbed cache lines will be such that subsequent evictions of those lines do not cause write backs (assuming no additional writes to the cache lines occur between the scrub and the burst of read requests). Accordingly, this is not a scheme in which data is evicted early; instead, the proposed paradigm can actually remove the need to writeback data upon eviction. The cache writeback circuit can be paused during operation if demand for the memory circuit crosses some threshold that indicates relatively high demand. In various embodiments, the cache writeback circuit is activated only when needed to avoid unnecessary power loss.

Figure 1B:
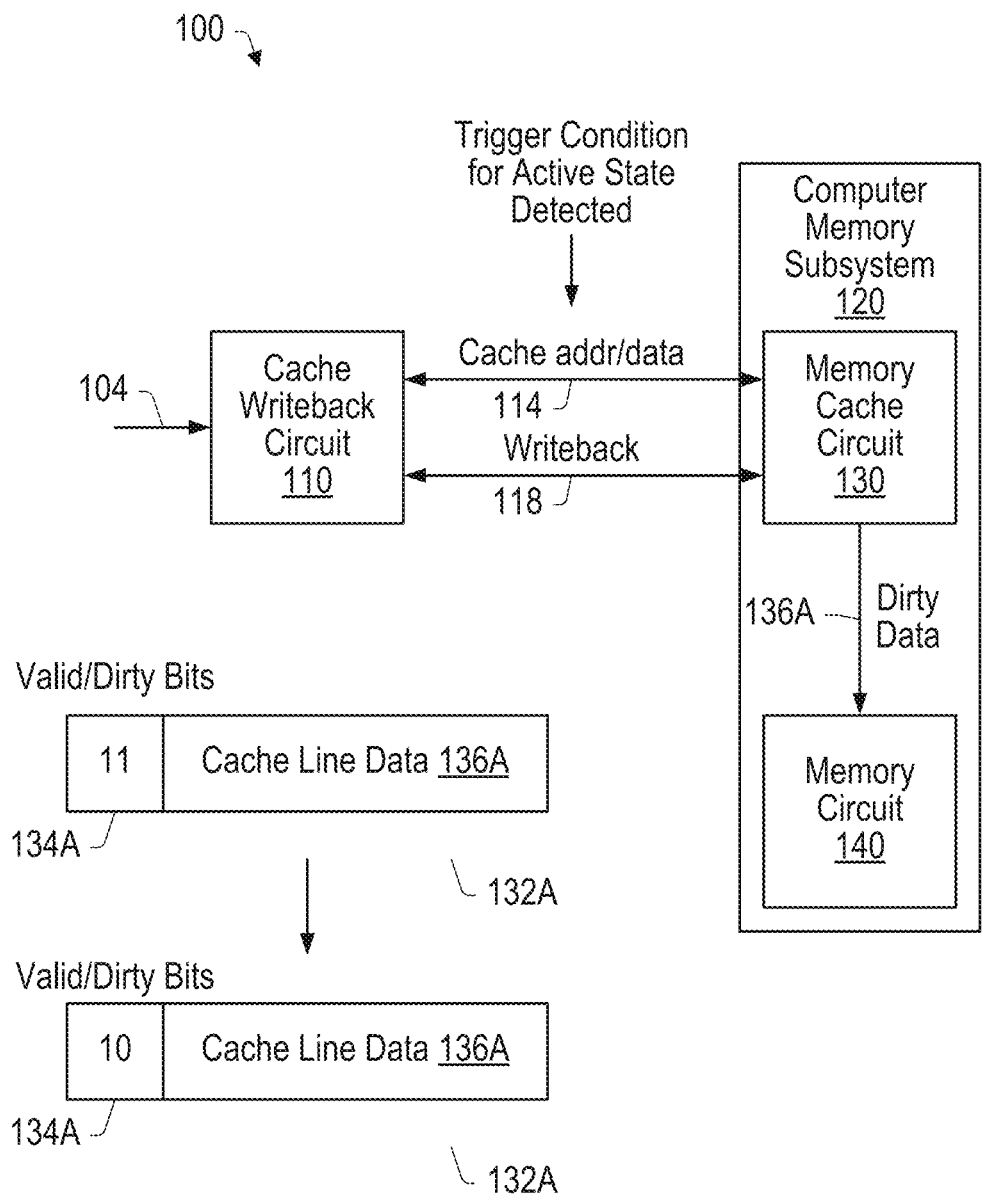
FIG. 1B is a block diagram illustrating one embodiment of a cache writeback circuit.

FIG. 1B is a block diagram of a computer system 100 that includes a cache writeback circuit 110 configured to write back dirty cache data without invalidating that data. As depicted, computer system 100 includes cache writeback circuit 110 coupled to a memory cache circuit 130. Memory cache circuit 130 is part of a computer memory subsystem 120 that also includes memory circuit 140. Generally speaking, cache writeback circuit 110 is configured to attempt to infer memory bandwidth contention scenarios similar to that described with reference to FIG. 1A, and, in response, preemptively write back, without invalidating, dirty data from memory cache circuit 130 to memory circuit 140 during times of low bandwidth usage.

Computer memory subsystem 120 is organized according to a memory hierarchy as that term is understood in the art. The highest level of the memory hierarchy commonly is made up CPU registers, with one or more memory caches at successively lower levels, followed by system memory (comprised of volatile memory such as DRAM), and non-volatile storage such as disk. There are many possible memory hierarchies—one possible configuration, from highest level to lowest level, is CPU registers→L1 cache→L2 cache→memory controller cache→RAM→disk.

The portion of the memory hierarchy depicted in FIG. 1B includes two levels: memory cache circuit 130 and memory circuit 140. Memory cache circuit 130 is at a higher level than memory circuit 140, meaning that, within the memory hierarchy, memory cache circuit 130 is one level closer to CPUs in computer system 100 than is memory circuit 140, and memory circuit 140 is one level closer to backing storage than is memory cache circuit 130.

As noted, memory cache circuit 130 may be any cache circuit within computer system 100. In one implementation, memory cache circuit 130 is just above volatile memory in the memory hierarchy, such that memory cache circuit 130 is a memory controller cache and memory circuit 140 is volatile memory. In such an implementation, when dirty data is evicted from memory cache circuit 130, it is written back to volatile memory. This writeback operation is also referred to as "cache scrubbing" or "scrubbing" throughout this disclosure.

Cache writeback circuit 110 receives a variety of inputs from computer system 100, which are labeled as state information 104 in FIG. 1B. In response to certain combinations of values of state information 104, a trigger condition for an active state of cache writeback circuit 110 may be detected. Based on this trigger condition, cache writeback circuit 110 is configured to perform a cache walk of memory cache circuit 130 in which cache lines are checked for dirty data. This cache walk may be performed via interface 114, in which cache address information (e.g., set/way for a set-associative cache) is sent to memory cache circuit 130, resulting in data from the cache line being returned via interface 114. If cache writeback circuit 110 determines that the current cache line being interrogated has dirty data, cache writeback circuit 110 may initiate a writeback of that dirty data via writeback interface 118. As will be described, the cache walk continues in this manner until the cache walk is paused or reset. Pausing can occur, for example, if requests to memory circuit 140 (other than scrubbing-induced writebacks) increase. A reset can occur if all the cache lines are checked for dirty data (i.e., the cache walk completes in normal course), the performance state of memory circuit 140 is reduced to a low level, or other software-induced activity occurs (drop requests, cache disable, etc.).

Memory cache circuit 130 includes a plurality of cache lines 132, including a particular cache line designated in FIG. 1B with reference numeral 132A. As depicted, cache line 132A includes valid/dirty bits 134A and cache line data 136A. Assume that valid/dirty bits 134A are initially both set when the cache walk being performed by cache writeback circuit 110 is initiated. When cache line 132A is accessed by cache writeback circuit 110 during its cache walk, the valid and dirty bits will indicate that this cache line should be written to memory. As noted, this is initiated via writeback interface 118, which will cause dirty cache line data 136A to be written to memory circuit 140. This writeback is accomplished without invalidating cache line data 136A. As shown in FIG. 1B, after scrubbing has been performed, the valid bit for cache line data 136A remains set, but the dirty bit for cache line 132A has been cleared. Accordingly, a subsequent eviction of cache line data 136A will only need to invalidate the cache line; no data need be written to memory circuit 140.

As will be described, in certain embodiments, activation of the cache writeback circuit 110 may be based on high cache miss bandwidth in recent windows of time, high eviction writebacks in the window of high cache miss bandwidth, a low number of current read/write requests pending between memory cache circuit 130 and memory circuit 140, a high number of dirty cache lines in memory cache circuit 130, and a performance state of memory circuit 140 being above a certain level (all measured based on specified threshold levels).

Figure 1C:
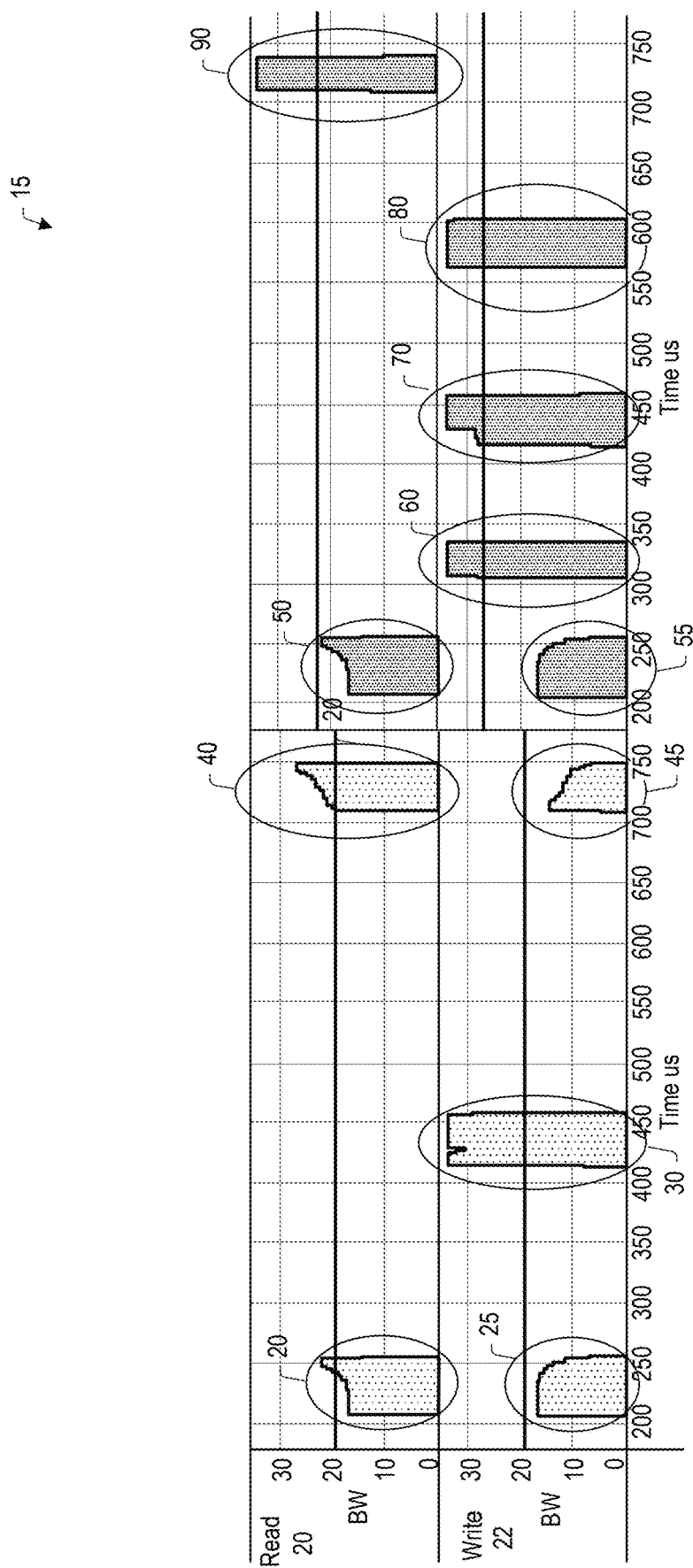
FIG. 1C is a diagram illustrating memory activity with read and write contention in a computer system that does use a cache writeback circuit as disclosed herein.

Exemplary effects and advantages of cache writeback circuit 110's scrubbing operations are now shown with respect to FIG. 1C. Graph 15 includes two constituent graphs side by side. The graph on the left is simply graph 10 from FIG. 1A, which is included for comparison. The graph on the right illustrates the same activity as in graph 10, but with cache writeback circuit 110 being operational.

Read burst 50 and evictions 55 are similar to read burst 20 and evictions 25 in that scrubbing has not yet been performed by cache writeback circuit 110 in the graph on the right. Cache writeback circuit 110 triggers after read burst 50 and evictions 55, causing a group of scrubbing evictions labeled by reference numeral 60. These scrubbing evictions are followed by normal write traffic to memory cache circuit 130 at reference numeral 70 (during which time cache writeback circuit 110 may be paused), followed by resumption of scrubbing which completes with a group of scrubbing evictions labeled by reference numeral 80. As a result of this scrubbing, the subsequent burst of reads at reference numeral 90 does not cause a corresponding group of evictions (compare 90 with 40/45). This leads to increased memory bandwidth relative to the graph on the left, in which cache writeback circuit 110 is not active. FIG. 1C thus illustrates that cache writeback circuit 110 may lead to higher read bandwidth peaks due to scrubbing, since fewer subsequent eviction writes will be able to contend with read misses for memory bandwidth when there is a read burst from some agent circuit. Some second-order power benefits may also accrue from operation of cache writeback circuit 110.

Cache writeback circuit 110 may be particularly effective in a system-wide implementation such as a system-on-a-chip (SoC) or chiplet implementation located on two more co-packaged integrated circuits. In these settings, when independent agent circuits within such computer systems have accesses allocated to a memory cache circuit located just above system memory in the memory hierarchy, cache writeback circuit 110 can advantageously increase peak memory bandwidth for these agent circuits.

To restate the issue being described in FIGS. 1A-C, a cache hit (e.g., read burst 20) is being forced to run at the system memory (e.g., DRAM) write rate. But the effect on system performance may extend, in an SoC environment, to the memory system of the source circuit (e.g., a GPU accessing the cache). Consider a scenario in which all the following caches are full: source circuit L1 cache hit→leads to L1 eviction→source circuit L2 cache hit→leads to L2 eviction→memory cache hit→leads to memory cache eviction→leads to DRAM write. Ideally, the L1 cache in the source circuit needs to be able to sink data far faster than the DRAM write bandwidth to avoid the L1 cache in the source circuit being reduced to DRAM bandwidth rates. Having a memory cache that can receive L2 evictions and be decoupled from DRAM write bandwidth via opportunistic scrubbing permits the source circuit to drain its cache at the rate of the communication fabric between the source circuit and the memory cache, as opposed to being forced to write at the DRAM bandwidth rate.

Cache Writeback Circuit Structure

Figure 2:
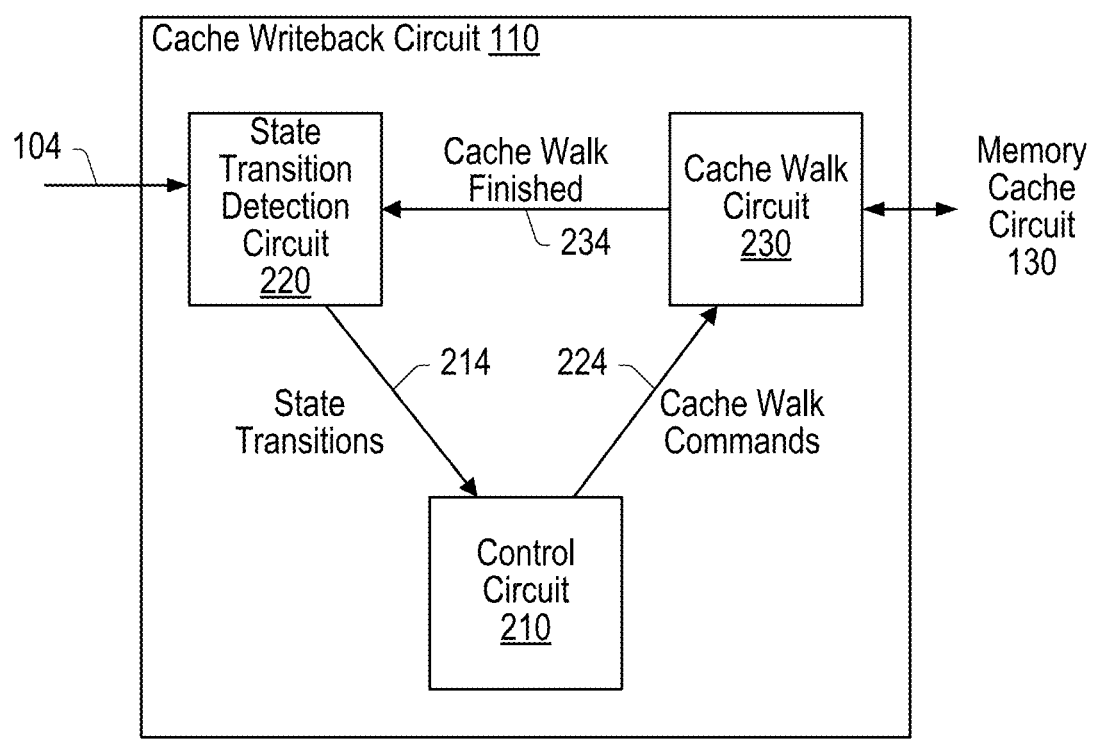
FIG. 2 is a block diagram illustrating high-level structure of one embodiment of a cache writeback circuit.

FIG. 2 is a block diagram of one embodiment of cache writeback circuit 110. As depicted, cache writeback circuit 110 includes control circuit 210, state transition detection circuit 220, and cache walk circuit 230. Exemplary internal structures of these circuits are described further below with reference to FIGS. 3A-B (control circuit 210), 4A-I (state transition detection circuit 220), and 5A-D (cache walk circuit 230).

In one embodiment, control circuit 210 is configured to implement a state machine that governs the operation of cache writeback circuit 110. A current state of this state machine is based on state transition signals 214 received from state transition detection circuit 220. Circuit 220, which receives state information 104 as inputs, is configured to determine whether various state transition criteria are met (for example, whether to begin a cache walk, suspend a cache walk, resume a cache walk, etc.). Based on state transition signals 214, control circuit 210 is configured to change the state of its state machine, and in so doing, assert various ones of cache walk commands 224 to cache walk circuit 230. Cache walk commands 224 instruct cache walk circuit 230 whether to begin a cache walk, suspend a cache walk, resume a cache walk, etc. Cache walk circuit 230 is configured, upon receiving a cache walk begin command, to interact with memory cache circuit 130 to locate dirty cache lines and cause the dirty data in such cache lines to be written to memory circuit 140 without being invalidated. When a cache walk is complete, cache walk circuit 230 is configured to assert cache walk finished signal 234 to state transition detection circuit 220, which, as will be described, causes a reset of the state machine managed by control circuit 210.

Cache writeback circuit 110 can of course be configured differently in other embodiments; the subsequent Figures and their corresponding descriptions set forth only one possible implementation.

Control Circuit Structure

Figure 3A:
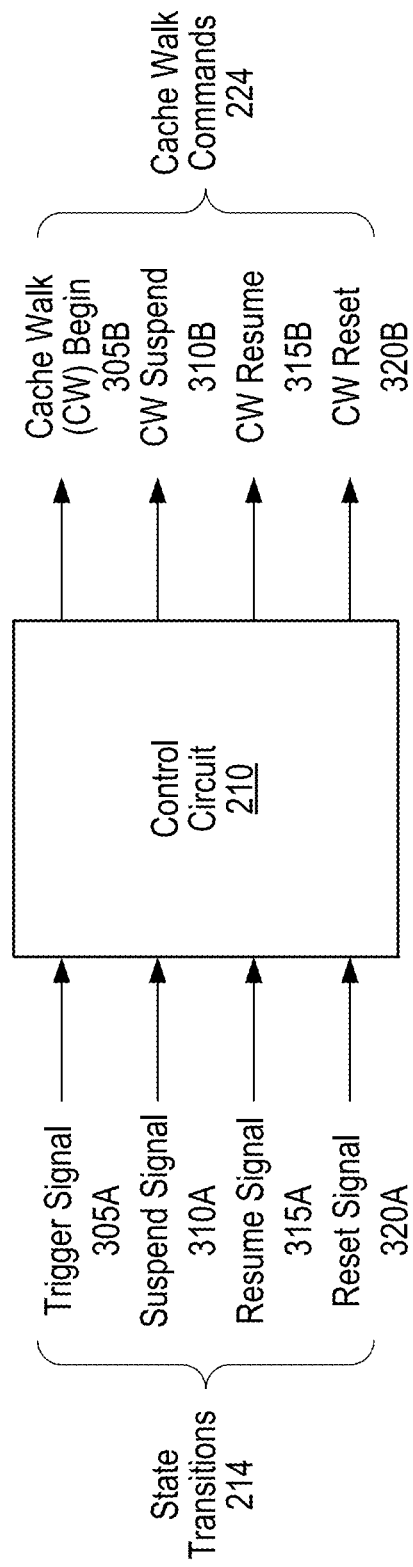
FIG. 3A is a block diagram showing inputs and outputs of one embodiment of a control circuit within a cache writeback circuit.

FIG. 3A is diagram showing exemplary inputs and outputs of control circuit 210. As shown, control circuit 210 receives four state transition signals (denoted as a group by reference numeral 214): trigger signal 305A, suspend signal 310A, resume signal 315A, and reset signal 320A. As will be described, these signals correspond to the transition conditions for the state machine implemented by control circuit 210 that will be described with reference to FIG. 3B.

Control circuit 210 is configured to output four possible cache walk commands 224. Commands 224 correspond to state transition signals 214: cache walk (CW) begin signal 305B, CW suspend signal 310B, CW resume signal 315B, and CW reset signal 320B. As will be described with reference to FIG. 3B, the various cache walk commands 224 are asserted upon entering various ones of the states in the state machine implemented by control circuit 210. Simply put, state transition signals 214 cause this state machine to perform a state transition; upon these transitions, one of cache walk commands 224 is asserted to cache walk circuit 230.

Figure 3B:
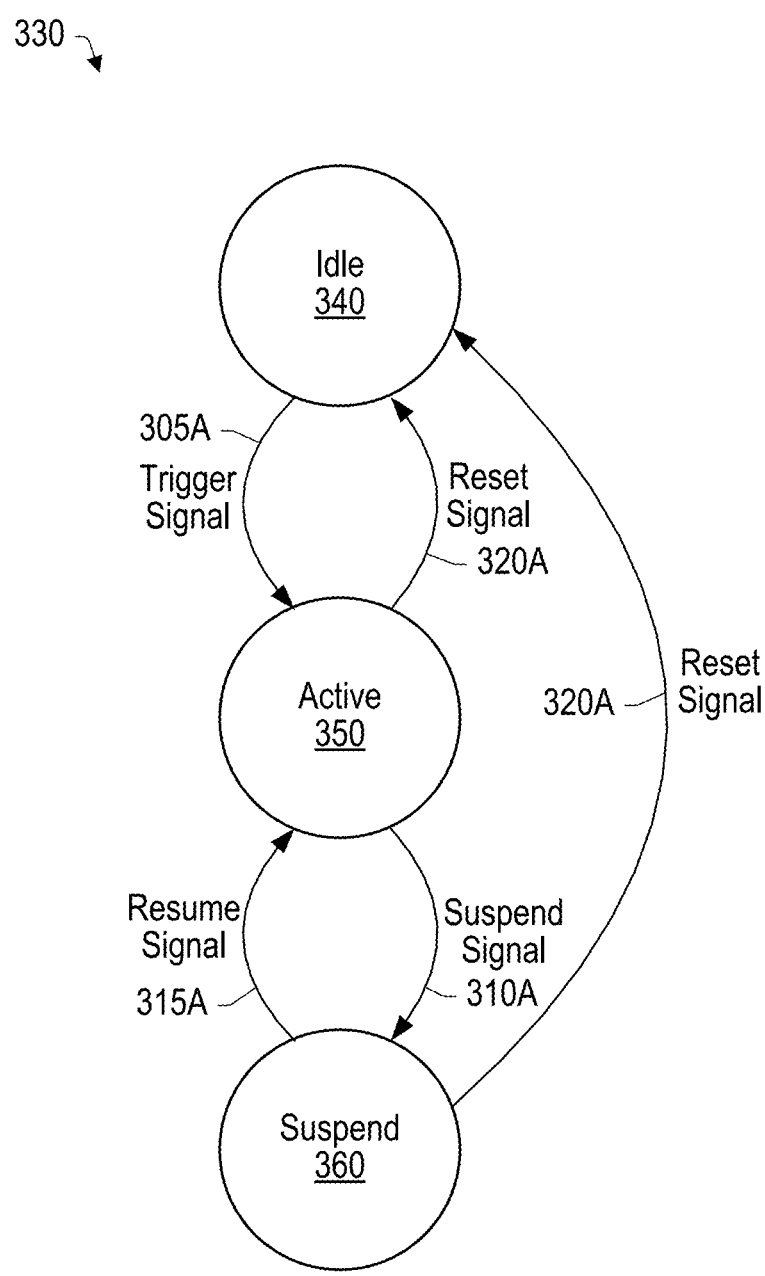
FIG. 3B is state diagram illustrating operation of one embodiment of a control circuit within a cache writeback circuit.

FIG. 3B is a flow diagram of a state machine 330 implemented by control circuit 210. As depicted, state machine 330 includes three states, idle state 340, active state 350, and suspend state 360. State machine 330 is configured to transition states upon various ones of state transition signals 214 (trigger signal 305A, suspend signal 310A, resume signal 315A, and reset signal 320A).

The default state of state machine 330 is idle state 340. State machine 330 remains in idle state 340 until receiving trigger signal 305A from state transition detection circuit 220 indicating that a new cache walk is to begin. Cache writeback circuit 110 uses idle state 340 to not waste unnecessary power performing scrubbing operations when conditions do not warrant such activity.

As noted, state machine 330 transitions from idle state 340 to active state 350 in response to receiving trigger signal 305A. In one embodiment, once in active state 350, control circuit 210 will assert CW begin signal 305B to cache walk circuit 230, thus causing a cache walk of memory cache circuit 130 to begin. As has been described, this cache walk searches for cache lines that are dirty and writes the data back to memory circuit 140 without invalidating them. The cache walk continues until the cache walk is suspended (indicated by suspend signal 310A) or reset (indicated by reset signal 320A).

As depicted, there are two possible transitions from active state 350: to idle state 340 and to suspend state 360.

Active state 350 transitions to suspend state 360 in response to suspend signal 310A. As part of this transition, control circuit 210 asserts CW suspend signal 310B, which causes the cache walk to be saved with its current state for possible resumption. State machine 330 remains in suspend state 360 until either the cache walk is resumed (in response to resume signal 315A) or reset (in response to reset signal 320A). Exemplary criteria for suspending and resuming the cache walk are discussed below with reference to FIG. 4H. For example, a cache walk might be suspended in response to a high-priority cache operation or low bandwidth between memory cache circuit 130 and memory circuit 140.

Active state 350 may also transition to idle state 340 in response to receiving reset signal 320A. Generally speaking, reset signal 320A is asserted in response to the cache walk finishing, detection of some condition that drastically changes the state of memory cache circuit 130, or detection of some other condition (e.g., performance state change) that makes continuance of the present cache walk undesirable. Exemplary cache walk reset criteria are discussed below with reference to FIG. 4I. When reset signal 320A is asserted during active state 350, state machine returns to idle state 340 and control circuit 210 asserts CW reset signal 320B.

In some embodiments, while in active state 350, cache writeback circuit 110 may implement one or more forms of rate control to limit the amount of memory bandwidth allocated to scrubbing operations. As will be described with respect to FIG. 5D, the cache walk being performed by cache walk circuit 230 during active mode may pause such that a current cache writeback must complete (for example, as measured by a system-wide global ordering point) before a next cache writeback can be initiated. Still further, additional rate controls can be implemented by cache walk circuit 230. For example, after a particular cache writeback completes, the next cache writeback may not be initiated for some set time period such as a specified number of clock cycles. Such rate control measures can avoid a scenario in which regular traffic between memory cache circuit 130 and memory circuit 140 is overly restricted by too many scrub requests. Rate control can thus be used to make sure scrubbing does not overly tax the bandwidth of memory circuit 140.

In the depicted embodiment, there are two possible paths out of suspend state 360, which state machine 330 enters when a current cache walk is suspended. If conditions for resuming the cache walk are met (as indicated by assertion of resume signal 315A), state machine 330 transitions to active state 350, in which control circuit 210 asserts CW resume 315B to cache walk circuit 230, which in turn causes the cache walk to restart (e.g., from the last way/set in the case of a set associative cache). If, on the other hand, conditions for terminating the cache walk are met (as indicated by assertion of reset signal 320A), state machine 330 transitions to idle state 340, in which control circuit 210 asserts CW reset signal 320B, causing cache walk circuit 230 to reset internal state values in preparation for a subsequent cache walk, which will start from a beginning location of the cache.

State Transition Detection Circuit Structure

State machine 330 thus transitions between states based on receiving state transition signals 214 (trigger signal 305A, suspend signal 310A, resume signal 315A, and reset signal 320A) which are generated by state transition detection circuit 220. The criteria for these transition signals can vary in different implementations of cache writeback circuit 110. One possible set of structures for implementing one particular set of transition criteria is now described in detail with reference to FIGS. 4A-I.

Figure 4A:
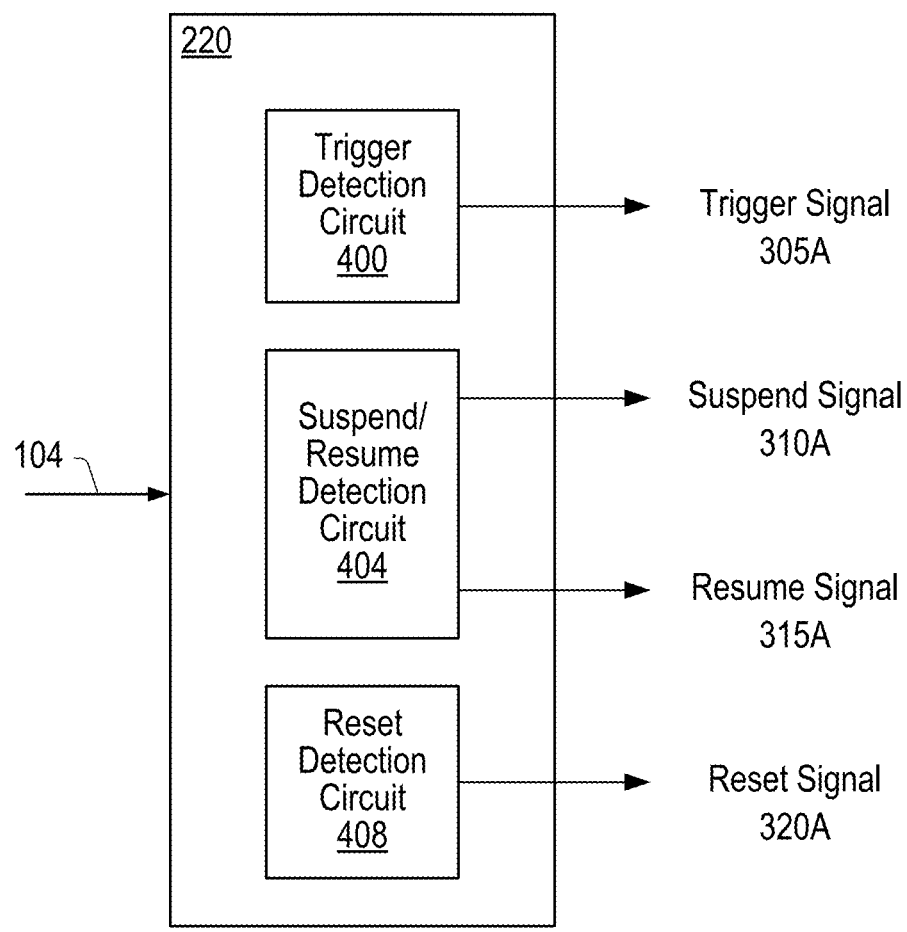
FIG. 4A is a block diagram of one embodiment of a state transition detection circuit within a cache writeback circuit.

FIG. 4A is a high-level block diagram of one embodiment of state transition detection circuit 220. In the organization shown in FIG. 4A, state transition detection circuit 220 includes trigger detection circuit 400 (described further with respect to FIGS. 4B-G), suspend/resume detection circuit 404 (described further with respect to FIG. 4H), and reset detection circuit 408 (described further with respect to FIG. 4I). As depicted, state transition detection circuit 220 receives state information 104 (an umbrella term which refers to any relevant set of input values). In response to receiving state information 104, trigger detection circuit 400 is configured to assert trigger signal 305A when appropriate, suspend/resume detection circuit 404 is configured to assert suspend signal 310A and resume signal 315A when appropriate, and reset detection circuit 408 is configured to assert reset signal 320A when appropriate.

Trigger Detection Circuit

Figure 4B:
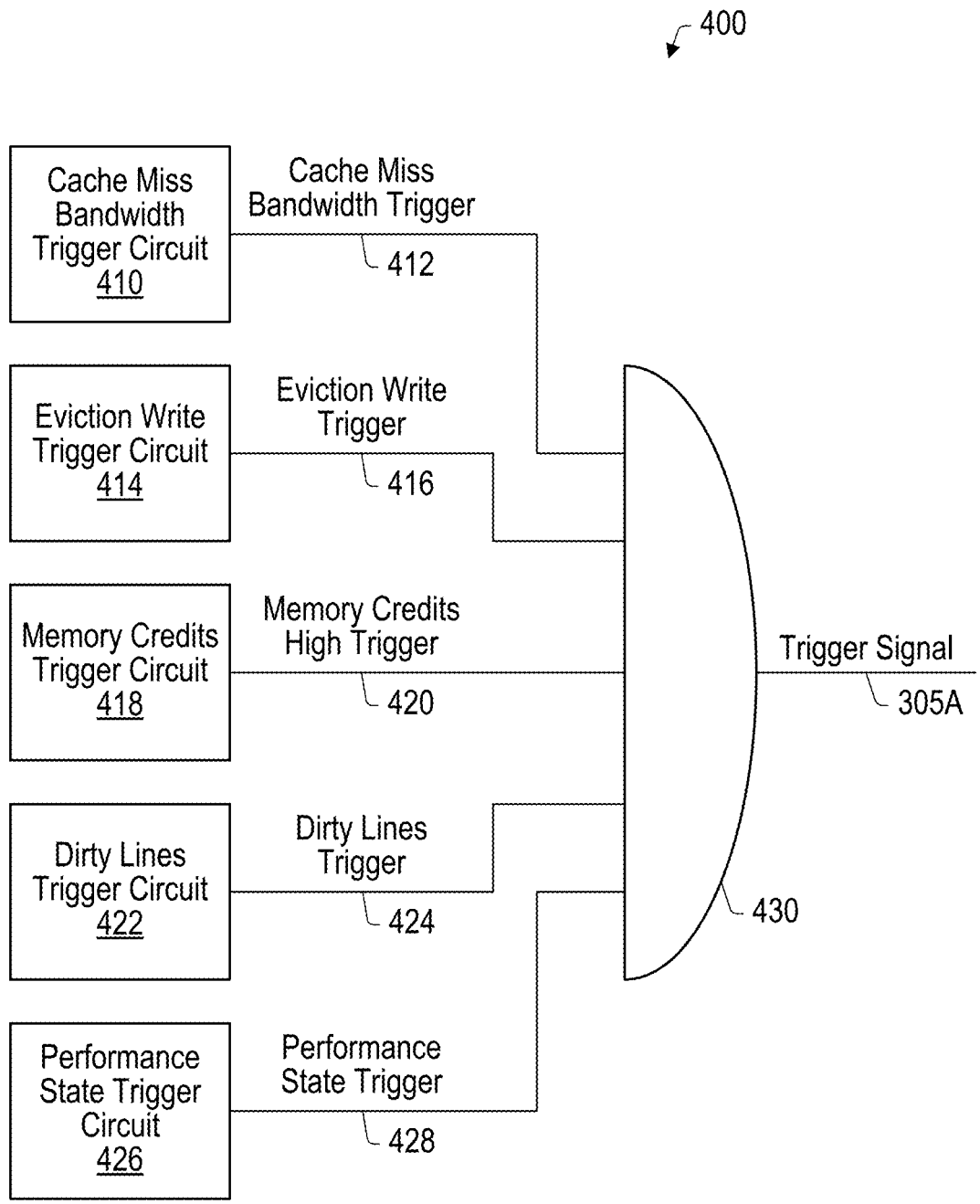
FIG. 4B is a block diagram of one embodiment of a trigger detection circuit within a state transition detection circuit.

There are various possible trigger conditions for cache writeback circuit 110 to commence a cache walk. One such set of conditions is shown in FIG. 4B, which is a block diagram of one embodiment of trigger detection circuit 400. As depicted, trigger signal 305A is asserted based on five conditions being true: 1) a sufficient amount of recent cache miss bandwidth being utilized between memory cache circuit 130 and memory circuit 140 (as indicated by cache miss bandwidth trigger 412, generated by cache miss bandwidth trigger circuit 410); 2) a sufficient amount of eviction traffic from memory cache circuit 130 to memory circuit 140 (as indicated by eviction write trigger 416, generated by eviction write trigger circuit 414); 3) a sufficient amount of read and write bandwidth to memory circuit 140 currently being available (as indicated by memory credits high trigger 420 (a proxy for the load on memory circuit 140), generated by memory credits trigger circuit 418; 4) a threshold amount of dirty cache lines being present in memory cache circuit 130 (as indicated by dirty lines trigger 424, generated by dirty lines trigger circuit 422); and 5) a performance state of memory circuit 140 being above some specified threshold (as indicated by performance state trigger 428, generated by performance state trigger circuit 426). When cache miss bandwidth trigger 412, eviction write trigger 416, memory credits high trigger 420, dirty lines trigger 424, and performance state trigger 428 are all asserted, AND gate 430 will assert trigger signal 305A. Other arrangements of combinatorial logic are possible, including with signals having different polarities.

Figure 4C:
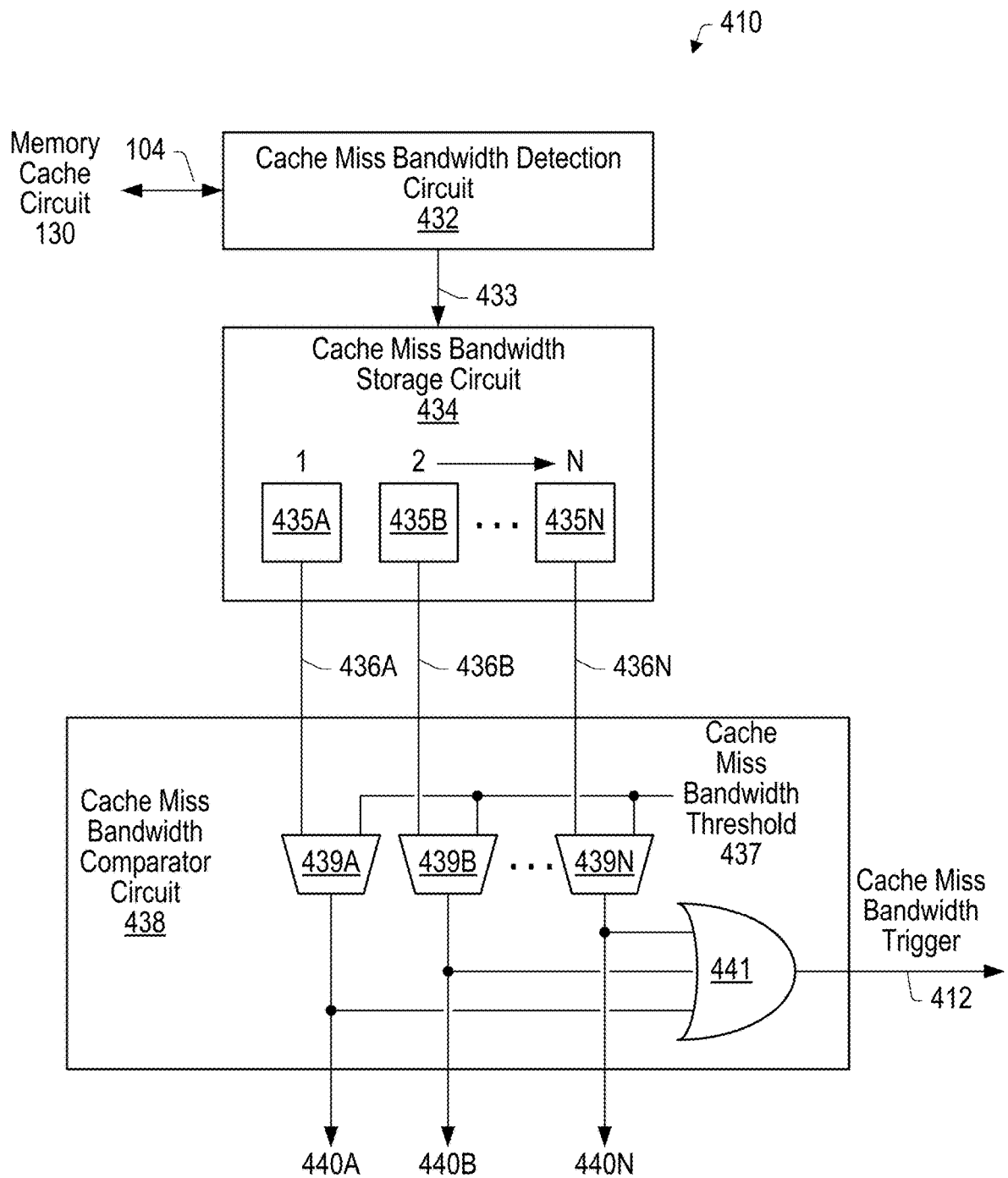
FIG. 4C is a block diagram of one embodiment of a cache miss bandwidth trigger circuit within a state transition detection circuit.

Possible internal structures for cache miss bandwidth trigger circuit 410, eviction write trigger circuit 414, memory credits trigger circuit 418, dirty lines trigger circuit 422, and performance state trigger circuit 426 are shown and described with respect to FIGS. 4C (circuit 410), 4D (circuit 414), 4E (circuit 418), 4F (circuit 422), and 4G (circuit 426).

Generally speaking, the motivation for the particular set of trigger conditions detailed in FIG. 4B is to attempt to infer a scenario such as that shown in FIG. 1A, in which there is contention for bandwidth between memory cache circuit 130 and memory circuit 140 from both accesses to memory cache circuit 130 by agent circuits within computer system 100 (e.g., GPU, processor circuit, etc.) and evictions of dirty data resulting from these accesses. Cache miss bandwidth trigger 412, as will be described, detects whether bandwidth between memory cache circuit 130 and memory circuit 140 has recently exceeded some threshold (e.g., exceeded a threshold in a most recent time window or at least once in N most recent time windows, where a time window is some fixed amount of time such as 10 µs). Trigger 412, then, is an attempt to determine whether there is a memory access, such as the read burst labeled in FIG. 1A with reference numeral 20, that is allocated to memory cache circuit 130 and leads to a miss that causes an access to memory circuit 140. If there has not been a recent burst of activity to memory cache circuit 130, it may not make sense to activate cache writeback circuit 110. Activation without sufficient corresponding cache miss activity may needlessly consume power.

Eviction write trigger 416, on the other hand, detects whether evictions of dirty data from memory cache circuit 130 to memory circuit 140 has recently exceeded some threshold (e.g., in a most recent time window or within some determined N number of time windows). Trigger 416 is an attempt to detect the existence of significant writeback of dirty data to memory circuit 140 such as the evictions labeled with reference numeral 25 in FIG. 1A. The reason for including eviction write trigger 416 as part of the determination of trigger signal 305A is that even if there is a significant amount of cache miss activity (e.g., as indicated by cache miss bandwidth trigger 412), it is not necessarily the case that there will be a corresponding significant amount of writebacks of dirty data. For example, memory cache circuit 130 might, in some instances, have mostly or all clean cache lines when read burst 20 occurs, which would mean there would be little or no writeback activity (such that evictions 25 would not be present or great reduced). Trigger 416 is thus used to infer whether recent significant cache miss activity (indicated by trigger 412) caused significant corresponding evictions of dirty data.

Dirty lines trigger 424 detects whether there are a sufficient number of dirty cache lines in memory cache circuit 130. Note that this is different from eviction write trigger 416. Just because there is some indication of recent writebacks of dirty data (which trigger 416 signifies), it does not mean that there is necessarily a sufficient amount of dirty data remaining in memory cache circuit 130 to justify a cache walk. Inclusion of dirty lines trigger 424 in the criteria for trigger signal 305A is thus used to determine whether there are a sufficient number of dirty cache lines to justify the time and power expense of a cache walk. It might not make sense, in some cases, to perform a cache walk of memory cache circuit 130 if there are only a small number of dirty cache lines.

Memory credits high trigger 420, in one embodiment, detects whether there is sufficient read and write bandwidth between memory cache circuit 130 and memory circuit 140. In one implementation of cache writeback circuit 110, it may be desired that the operation of this circuit not unduly interfere with the normal operation of memory cache circuit 130. Trigger 420 thus ensures that there is sufficient bandwidth currently available between memory cache circuit 130 and memory circuit 140 to permit a cache walk (and resulting writeback activity) to occur. Channels between memory cache circuit 130 and memory circuit 140 may be organized as having a certain number of read and write "credits," which are a proxy for available bandwidth. If, for example, there are too few read and write credits (measured against some specified threshold), it may be inadvisable to operate cache writeback circuit 110. Trigger 420 is thus designed to determine whether there are sufficient read and write credits available to justify beginning a cache walk. Commencing scrubbing when available bandwidth is low would lead to a strong possibility that scrubbing operations would occupy whatever limited bandwidth is available, adversely impacting operation of memory cache circuit 130.

Finally, performance state trigger 428 is used to determine whether the current performance state of memory circuit 140 is above some threshold. As used herein, a "performance state" for a circuit such as memory circuit 140 refers to a particular combination of operating parameters such as a voltage level supplied to the circuit and a frequency at which the circuit operates. As is understood in the art, circuits can operate at different performance states. Relatively high performance states can be employed when performance is at a premium; conversely, relatively low performance states can be employed when other factors, such as power consumption, are considered more important (e.g., in the case of battery life). In the implementation of trigger signal 305A, performance state trigger 428 is intended to determine whether a cache walk is warranted in view of the current performance state of memory circuit 140. If performance state trigger 428 indicates that the current performance state of memory circuit 140 is above (or at) a specified threshold, this may be interpreted as an indication that performance is desired, and that performing a cache walk to scrub the cache to avoid the contention scenario of FIG. 1A may be worthwhile. If, on the other hand, performance state trigger 428 indicates that the current performance state of memory circuit is below (or at) the threshold, this may be interpreted that it is important to conserve power, and a cache walk should thus not be attempted.

It bears repeating that the particular criteria utilized to generate trigger signal 305A in FIG. 4B represents only one possible implementation. In other embodiments, any subset of the criteria set forth in FIG. 4B may be employed. For example, trigger signal 305A might be generated based solely from an AND of cache miss bandwidth trigger 412 and eviction write trigger 416 in one embodiment. Additionally, a different set of trigger criteria than that shown in FIG. 4B may be employed.

FIG. 4C is a block diagram of one embodiment of cache miss bandwidth trigger circuit 410 that is used to generate cache miss bandwidth trigger 412. As depicted, cache miss bandwidth trigger circuit 410 includes cache miss bandwidth detection circuit 432, cache miss bandwidth storage circuit 434, and cache miss bandwidth comparator circuit 438. At a high level, circuit 410 receives state information 104 from memory cache circuit 130 and asserts cache miss bandwidth trigger 412 in response to a determination of recent significant cache miss activity between memory cache circuit 130 and memory circuit 140 in one or more of the last N time windows.

Cache miss bandwidth detection circuit 432, in the illustrated embodiment, is configured to measure and store an indication of cache miss memory traffic between memory cache circuit 130 and memory circuit 140 during a specified time window (e.g., 10 µs, 20 µs, 100 µs). The structure of circuit 432 (not pictured for simplicity) in one embodiment includes a detection circuit configured to detect cache miss memory activity on a channel between memory cache circuit 130 and memory circuit 140, a counter circuit configured to aggregate an indication of the cache miss memory activity (which serves as a proxy for cache miss bandwidth utilization), and a timer circuit configured to measure the specified time window. When the timer circuit indicates the end of the time window, the value of the counter circuit (or some manipulated version thereof) may be output as cache miss bandwidth measurement 433 to cache miss bandwidth storage circuit 434. The process then repeats for the next time window. Note that in some implementations, cache miss bandwidth detection circuit 432 may actually be located in memory cache circuit 130 with cache miss bandwidth measurement 433 being conveyed to cache miss bandwidth storage circuit 434.

Cache miss bandwidth storage circuit 434, in the illustrated embodiment, is configured to store the last N cache miss bandwidth measurements 433 made by cache miss bandwidth detection circuit 432 in storage locations 435. N can be any suitable value such as 5, 10, 15, etc. In an initial time window, circuit 434 is configured to store an initial cache miss bandwidth measurement in storage location 435A. In the next time window, the value in storage location 435A is shifted to storage location 435B and the second cache miss bandwidth measurement is stored in storage location 435A. The process continues until all N storage locations 435 are filled. Upon receiving a subsequent cache miss bandwidth measurement 433, the value in storage location 435N is shifted out and discarded, such that only the last N cache miss bandwidth measurements 433 are retained at a given time.

Cache miss bandwidth comparator circuit 438 is configured to receive the most recent N cache miss bandwidth measurement values stored in storage locations 435 via signals 436A-N at corresponding comparators 439A-N. Each of comparators 439A-N is configured to compare these last N cache miss bandwidth measurements to a specified cache miss bandwidth threshold 437. Threshold 437 may be specified in any of a variety of ways, such as in some percentage of maximum possible cache miss bandwidth (e.g., 20% or 40% of maximum cache miss bandwidth). In the illustrated embodiment, the comparator outputs are represented by reference numerals 440A-N. Outputs 440A-N indicate for each of the last N time windows whether threshold 437 has been satisfied (e.g., exceeded, met or exceeded in various implementations). Outputs 440 are all fed into N-input OR gate 441, which asserts cache miss bandwidth trigger 412 if cache miss bandwidth threshold 437 is satisfied in any of the last N time windows.

Outputs 440 are also conveyed to eviction write trigger circuit 414, which will be described next with respect to FIG. 4D.

Figure 4D:
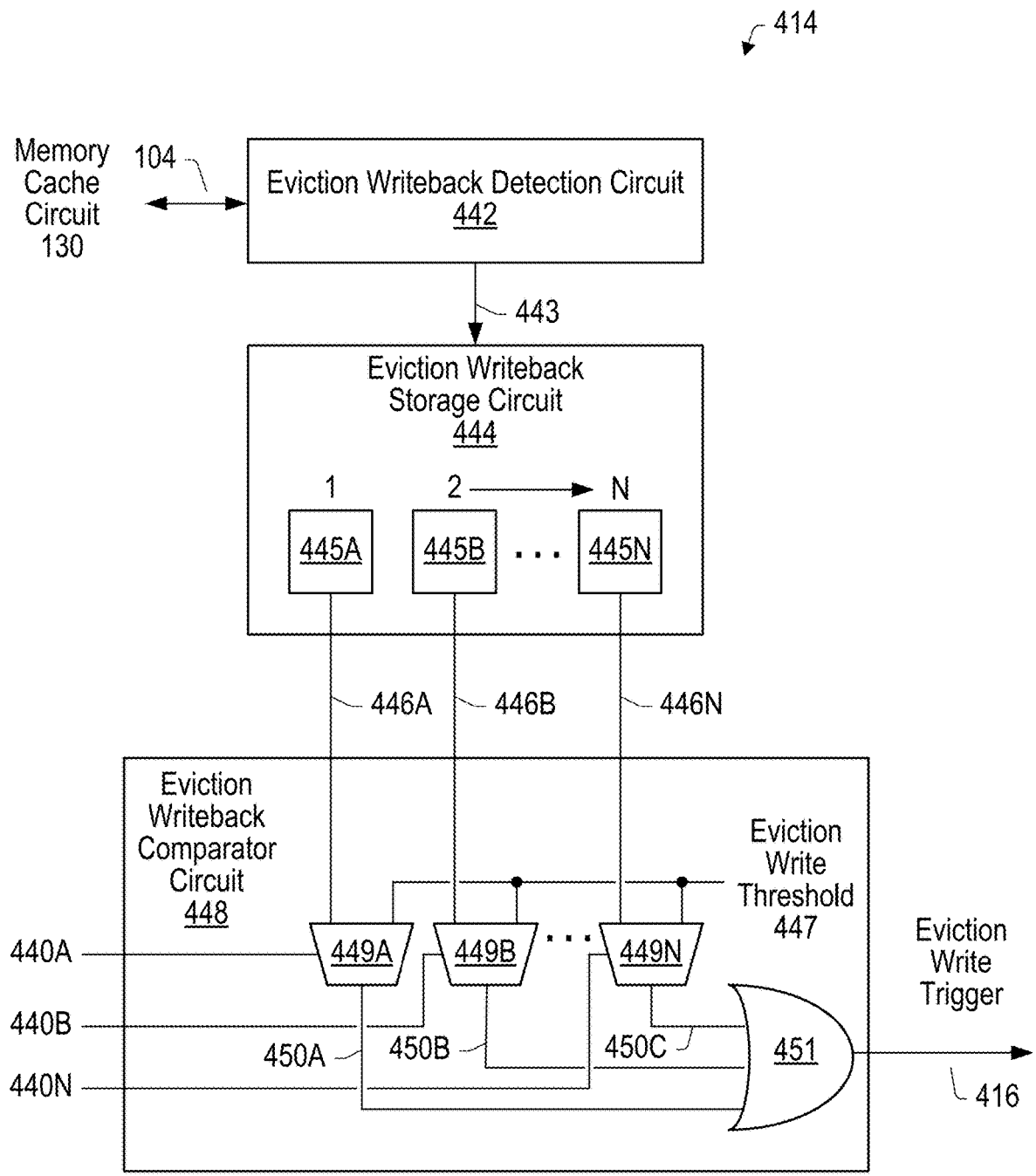
FIG. 4D is a block diagram of one embodiment of an eviction write trigger circuit within a state transition detection circuit.

FIG. 4D is a block diagram of one embodiment of eviction write trigger circuit 414 that is used to generate eviction write trigger 416. As depicted, eviction write trigger circuit 414 includes eviction writeback detection circuit 442, eviction writeback storage circuit 444, and eviction writeback comparator circuit 448. At a high level, circuit 414 is similar to circuit 410 just described with respect to FIG. 4C. Circuit 414 receives state information 104 from memory cache circuit 130 and asserts eviction write trigger 416 in response to a determination of recent significant cache eviction activity between memory cache circuit 130 and memory circuit 140 in one or more of the last N time windows in which there was also significant cache miss activity as determined by cache miss bandwidth trigger circuit 410.

Eviction writeback detection circuit 442, in the illustrated embodiment, is configured to measure and store an indication of cache eviction memory traffic between memory cache circuit 130 and memory circuit 140 during a specified time window (e.g., 10 µs, 20 µs, 100 µs). Notably, the time windows used by circuit 442 are typically the same as those used by circuit 432 described with respect to FIG. 4C. The structure of circuit 442 (not pictured for simplicity) in one embodiment includes a detection circuit configured to detect eviction activity on a channel between memory cache circuit 130 and memory circuit 140, a counter circuit configured to aggregate an indication of the eviction activity (which serves as a proxy for write bandwidth utilization), and a timer circuit configured to measure the specified time window. When the timer circuit indicates the end of the time window, the value of the counter circuit (or some manipulated version thereof) may be output as write bandwidth measurement 443 to eviction writeback storage circuit 444. The process then repeats for the next time window. Note that in some implementations, eviction writeback detection circuit 442 may be located in memory cache circuit 130 and configured to convey write bandwidth measurement 443 to eviction writeback storage circuit 444.

Eviction writeback storage circuit 444, in the illustrated embodiment, is configured to store the last N write bandwidth measurements 443 made by eviction writeback detection circuit 442 in storage locations 445. N can be any suitable value such as 5, 10, 15, etc., and will typically be the same value of N used in cache miss bandwidth storage circuit 434. In an initial time window, circuit 444 is configured to store an initial write bandwidth measurement in storage location 445A. In the next time window, the value in storage location 445A is shifted to storage location 445B and the second write bandwidth measurement is stored in storage location 445A. The process continues until all N storage locations 445 are filled. Upon receiving a subsequent write bandwidth measurement 443, the value in storage location 445N is shifted out and discarded, such that only the last N write bandwidth measurements 443 are retained at a given time.

Eviction writeback comparator circuit 448 is configured to receive, at corresponding comparators 449A-N, the most recent N write bandwidth measurement values stored in storage locations 445 via signals 446A-N. Each of comparators 439A-N is configured to compare these last N write bandwidth measurements to a specified eviction write threshold 447. Threshold 447 may be specified in any of a variety of ways, such as in some percentage of maximum possible write bandwidth (e.g., 20% or 40% of maximum write bandwidth). Recall that it is desired to detect a scenario in which there is contention between cache miss and eviction bandwidth (e.g., read burst 20 and evictions 25 occur at the same time). For this reason, eviction writeback comparator circuit 448 is configured to not only to detect whether one of the last N time windows had a write bandwidth measurement 443 that satisfies (e.g., meets or exceeds) eviction write threshold 447, but also whether that same time window satisfied cache miss bandwidth threshold 437. This result is accomplished by using outputs 440 from circuit 410 to enable comparators 449. As described in FIG. 4C, outputs 440 are asserted for those ones of the last N time windows in which a cache miss bandwidth threshold is satisfied. As a result, in the illustrated embodiment, only those comparators 449 that correspond to a time window for which the cache miss threshold was met are enabled. Outputs 450 of comparators 449 will thus indicate whether any of the last N time windows satisfy the dual conditions of satisfying both cache miss (437) and eviction (447) thresholds. Outputs 450 are all fed into N-input OR gate 451, which asserts eviction write trigger 416 if the cache miss and eviction thresholds between memory cache circuit 130 and memory circuit 140 are both satisfied for at least one of the last N time windows.

Note that FIGS. 4C-D are premised on a particular trigger condition. For a different trigger condition, the constituent logic will necessarily be different.

Figure 4E:
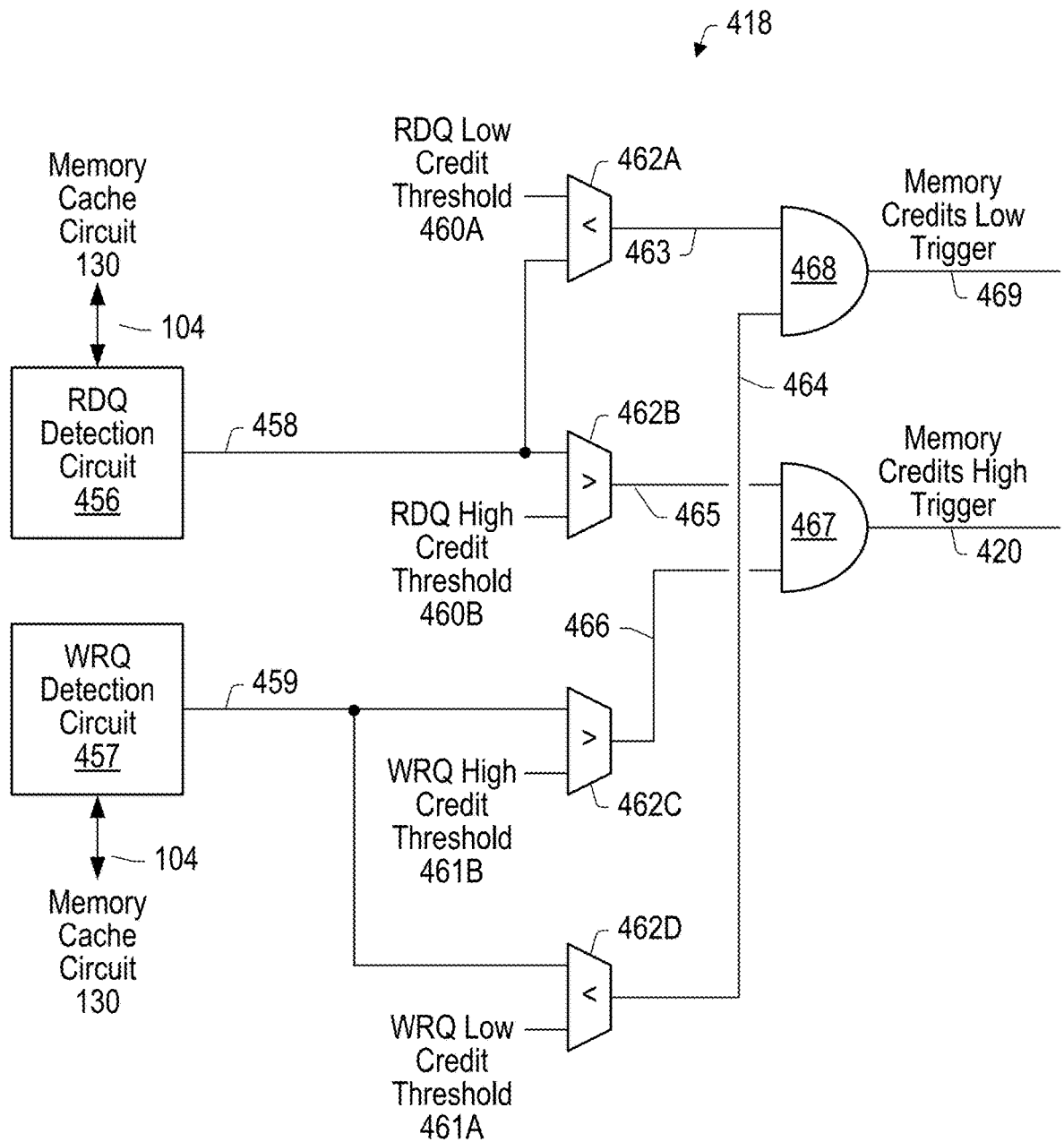
FIG. 4E is a block diagram of one embodiment of a memory credits trigger circuit within a state transition detection circuit.

FIG. 4E is a block diagram of one embodiment of memory credits trigger circuit 418 that is used to generate triggers related to the amount of memory credits available between memory cache circuit 130 and memory circuit 140. As depicted, memory credits trigger circuit 418 includes read queue (RDQ) detection circuit 456, write queue (WRQ) detection circuit 457, and is configured to generate memory credits high trigger 420 (used in trigger detection circuit 400) and memory credits low trigger 469 (used in suspend/resume detection circuit 404).

One mechanism used within computer systems to manage apportionment of system resources is a credit scheme. Such a scheme requires that a source circuit, before it issues a packet of data on a bus or network to a destination circuit, reserve a "credit" (or "network credit") that has been provided by the destination circuit (which equates in many cases to a buffer location in which the packet of data can be stored). A credit, as used herein, is any type of received indication from another entity in the system that represents the ability to send traffic.

Credits can be used, for example, to manage access to a channel between memory cache circuit 130 and memory circuit 140. This channel (not pictured in FIG. 4E) may have an associated read queue and write queue with some number of storage locations. When a source circuit (e.g., within memory cache circuit 130) wants to initiate a read or write over this memory channel, it may make a request for a credit from the read or write queue. If a credit is available, the credit is provided to the source circuit, and the number of available credits for the read or write queue is decremented. When the read/write request is handled, the credit is released, incrementing the available number of credits. If a credit is not available, the request is enqueued elsewhere, such as at the source circuit, which may stall in some cases.

Given such a credit system, the number of available credits at the read and write queues for the channel between memory cache circuit 130 and memory circuit 140 can be used to determine how busy that channel is. Consider a scenario in which 80% of the credits for both the read and write queues are currently available for use—this indicates relatively low demand for memory circuit 140. Such a condition might indicate that cache writeback circuit 110 can be activated. On the other hand, consider a scenario in which only 20% of the credits for both the read and write queues are available—this indicates relatively high demand for memory circuit 140. When there is a desire to not interfere with normal operation of memory cache circuit 130, the relative dearth of available read and write queue credits can be a good indication that cache writeback circuit 110 should not be activated.

Memory credits trigger circuit 418 operates using two sets of credit thresholds: a low set of thresholds (RDQ low credit threshold 460A and WRQ low credit threshold 461A) and a high set of thresholds (RDQ high credit threshold 460B and WRQ high credit threshold 461B). In one implementation, these credit thresholds are assessed based on the number of credits remaining to be allocated for each of these memory channels.

Consider a scenario in which there are 100 possible credits for each of the memory read and write queues. In this scenario, it may be desirable to permit cache scrubbing when there are at least 40 remaining credits in each queue (meaning that the memory channel is not particularly busy) and to suspend cache scrubbing where are less than 10 remaining credits in each queue (meaning that the memory channel is relatively busy). In this example, the high credit threshold would be 40 and the low credit threshold would be 10. Cache scrubbing would thus be permitted if the number of available credits in the memory read and write queues were both greater than 40 (or greater than or equal to 40 in another implementation). In such an example, cache scrubbing would be permitted if the read queue had 41 credits available and the write queue had 45 credits available, but not if the read queue had only 29 credits available. Conversely, cache scrubbing would be suspended if both the read and write queue each had less than 10 credits available (or less than or equal to 10 in another implementation). Note that these numbers are simply illustrative to demonstrate how circuit 418 is intended to work.

RDQ detection circuit 456 and WRQ detection circuit 457, as depicted, are both coupled to memory cache circuit 130 and are configured to detect an available number of credits available in the memory queues for reads and writes between memory cache circuit 130 and memory circuit 140, respectively. In some implementations, circuits 456 and 457 might be located within memory cache circuit 130. Circuits 456 and 457, in one embodiment, are configured to interact with a credit manager circuit for a memory channel interface of memory cache circuit 130 (not pictured) to retrieve remaining read credits 458 and remaining write credits 459. Remaining read credits 458, as its name suggests, indicates a number of remaining credits available in the memory read queue, while remaining write credits 459 indicates a number of remaining credits available in the memory write queue.

Remaining read credits 458 and remaining write credits 459 are conveyed to a set of comparators 462A-D. Comparator 462B is used to test whether remaining read credits 458 satisfies RDQ high credit threshold 460B (e.g., is greater than that threshold), while comparator 462C is used to test whether remaining write credits 459 satisfies WRQ high credit threshold 461B. If both conditions are true (as indicated by signals 465 and 466 respectively and as determined by AND gate 467), memory credits high trigger 420 is asserted. As has been described, memory credits high trigger 420 is needed to begin cache scrubbing in one embodiment and is used to assert trigger signal 305A as described with respect to FIG. 3B.

Conversely, comparator 462A is used to test whether remaining read credits 458 satisfies RDQ low credit threshold 460A (e.g., is less than that threshold), while comparator 462D is used to test whether remaining write credits 459 satisfies WRQ low credit threshold 461A. If both conditions are true (as indicated by signals 465 and 466 respectively and as determined by AND gate 467), memory credits low trigger 469 is asserted. This signal is used to determine whether to suspend and resume cache scrubbing, as will be described further with reference to suspend/resume detection circuit 404 in FIG. 4H.

Note that in alternate version of circuit 418, the thresholds and the corresponding circuit could be based on an already allocated number of credits in the read and write memory queues (rather than a remaining number of credits).

Figure 4F:
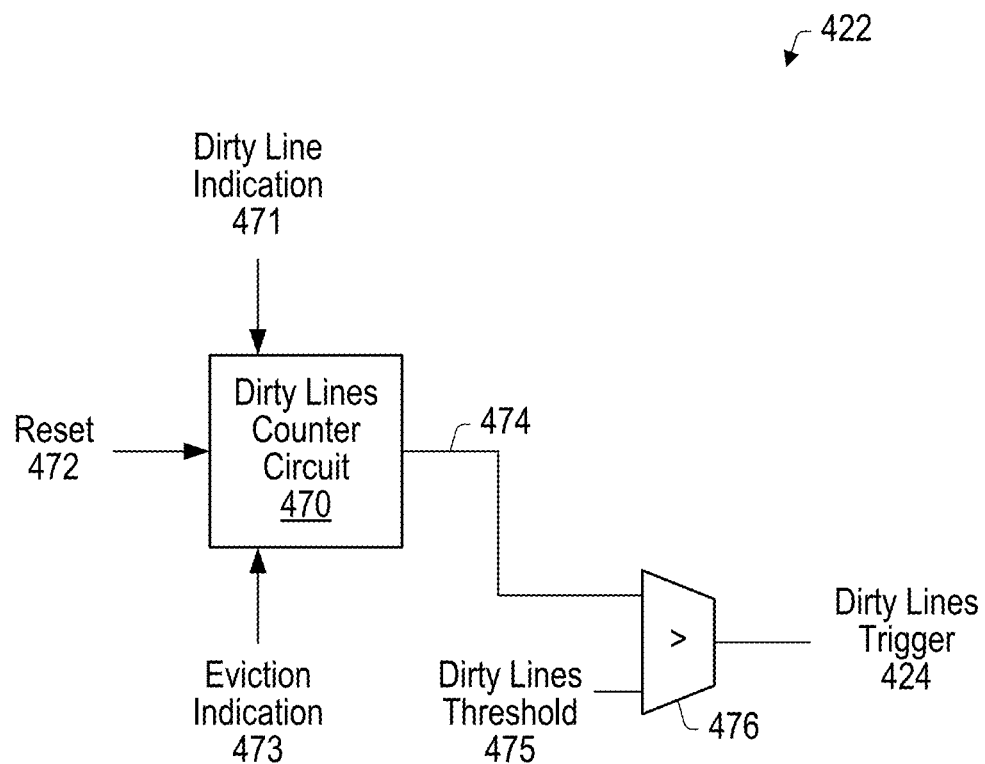
FIG. 4F is a block diagram of one embodiment of a dirty lines trigger circuit within a state transition detection circuit.

FIG. 4F is a block diagram of one embodiment of dirty lines trigger circuit 422 that is used to generate dirty lines trigger 424. As depicted, dirty lines trigger circuit 422 includes dirty lines counter circuit 470 and comparator 476. As has been described, the purpose of dirty lines trigger circuit 422 is to determine whether memory cache circuit 130 is sufficiently dirty to warrant scrubbing the cache. If there are relatively few dirty lines remaining in memory cache circuit 130, the power expense of performing a cache walk may not be justified.

Dirty lines counter circuit 470, which is coupled to or included within memory cache circuit 130, is configured to count the number of dirty lines within the cache. Dirty lines counter circuit 470 may be initialized via reset signal 472, which may be used on startup or in the event of major change in the cache state, such as a cache flush. Upon a change of state of a cache line within memory cache circuit 130 to "dirty," dirty line indication 471 is asserted, which causes dirty lines counter circuit 470 to increment its value. Conversely, when a cache line is evicted from memory cache circuit 130 and the state of that line changes to "clean," eviction indication 473 is asserted, which causes dirty lines counter circuit 470 to decrement its value.

The current value of dirty lines counter circuit 470 is output as dirty lines value 474, which is supplied to comparator 476. The other input is dirty lines threshold 475. If dirty lines value 474 satisfies dirty lines threshold 475 (e.g., is greater than that threshold), dirty lines trigger 424 is asserted.

Figure 4G:
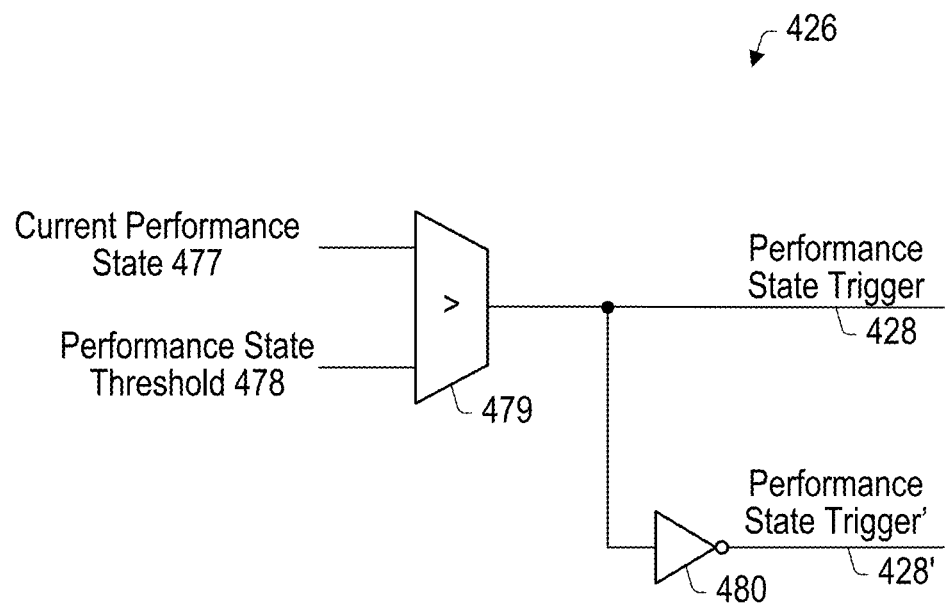
FIG. 4G is a block diagram of one embodiment of a performance state trigger circuit within a state transition detection circuit.

FIG. 4G is a block diagram of one embodiment of performance state trigger circuit 426 that is used to generate performance state trigger 428. As depicted, performance state trigger circuit 426 includes comparator 479 and inverter 480. Inputs to circuit 426 include current performance state 477, which is the performance state of memory circuit 140, and performance state threshold 478, which specifies the threshold for the performance state of the memory at which scrubbing is allowed.

The operation of circuit 426 is straightforward. If current performance state 477 satisfies performance state threshold 478, performance state trigger 428 is asserted. As has been described, this value is used to determine whether to assert trigger signal 305A. The complement of performance state trigger 428, performance state trigger' 428', is generated by inverter 480. As will be described, performance state trigger' 428' is an input to reset detection circuit 408.

Suspend/Resume Detection Circuit

Figure 4H:
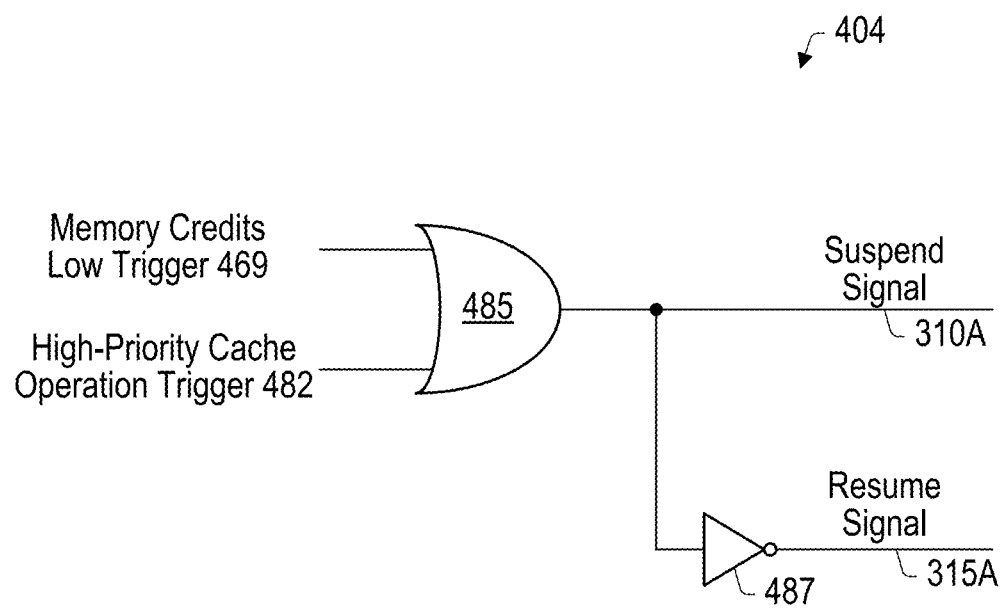
FIG. 4H is a block diagram of one embodiment of a suspend/resume detection circuit within a state transition detection circuit.

FIG. 4H is a block diagram of one embodiment of suspend/resume detection circuit 404. As shown, circuit 404 includes OR gate 485 and inverter 487. Inputs include memory credits low trigger 469 (described with respect to FIG. 4E) and high-priority cache operation 482, while outputs include suspend signal 310A and resume signal 315A.

When a cache walk is underway, various criteria can be established to determine whether to suspend (as opposed to abandon) the cache walk. In various implementations, it is desired that the cache scrubbing performed by cache writeback circuit 110 not detract from the normal operation of memory cache circuit 130. FIG. 4H describes two possible criteria for asserting suspend signal 310A. Memory credits low trigger 469 is asserted when both the remaining available credits for each of the read and write queues for the memory channel between memory cache circuit 130 and memory circuit 140 are below a specified threshold. When trigger 469 is asserted, it is an indication that cache scrubbing should be discontinued to ensure that any memory resources be reserved for normal cache memory activity.

In a similar vein, high-priority cache operation trigger 482 is an indication that some higher-priority cache operation has been requested, and that the cache walk should be suspended. Examples of higher-priority cache operations include a writeback of all cache lines requested by a specific command (e.g., a security request between different users), and a cache invalidation requested by a specific command (this may happen, for example when a piece of software finishes work and the data is no longer relevant). Note that trigger 482 may be an OR of a number of possible high-priority cache operations. In the depicted implementation, either memory credits low trigger 460 or high-priority cache operation trigger 482 can cause suspend signal 310A to be asserted.

Note that resume signal 315A is simply the complement of suspend signal 310A, and is generated by inverter 487. Accordingly, while state machine 330 is in suspend state 360, if memory credits low trigger 469 and high-priority cache operation trigger 482 are both deasserted, suspend signal 310A would be deasserted and resume signal 315A would be reasserted.

Reset Detection Circuit

Figure 4I:
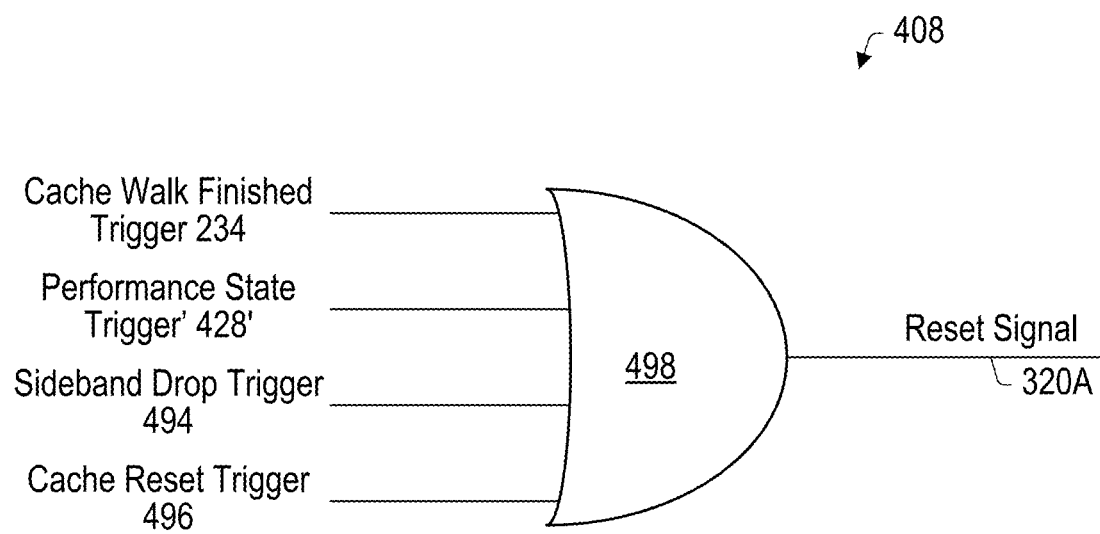
FIG. 4I is a block diagram of one embodiment of a reset detection circuit within a state transition detection circuit.

FIG. 4I is a block diagram of one embodiment of reset detection circuit 408. As depicted, circuit 408 includes OR gate 498, which outputs reset signal 320A, which causes state machine 330 to return to idle state 340. Inputs include signals indicative of various reset conditions, any of which can cause reset signal 320A to be asserted.

The conclusion of a cache walk, indicated by cache walk finished signal 234, is one possible condition that can cause state machine 330 to reset. A drop in the current performance state of memory circuit 140 below performance state threshold 478, indicated by the assertion of performance state trigger' 428', is another trigger for a reset of the cache walk. Simply put, the performance state of memory circuit 140 may indicate that power consumption/battery life is more important at present than any performance gains afforded by the cache scrubbing.

Another reset indication is the assertion of sideband drop trigger 494. A sideband drop is a cache operation described below with reference to FIG. 5E in which certain cache lines are invalidated using its own cache walk. This operation is significant enough in terms of resources that it can justify resetting the current cache walk being performed for scrubbing purposes.

Finally, cache reset trigger 496 is indicative of any other cache operation that drastically changes the state of the cache. Examples include, but are not limited to, disabling memory cache circuit 130, disabling allocation of memory cache circuit 130, and flushing memory cache circuit 130.

As shown, assertion of any of the inputs to OR gate 498 can cause assertion of reset signal 320A.

Cache Walk Circuit Structure

Figure 5A:
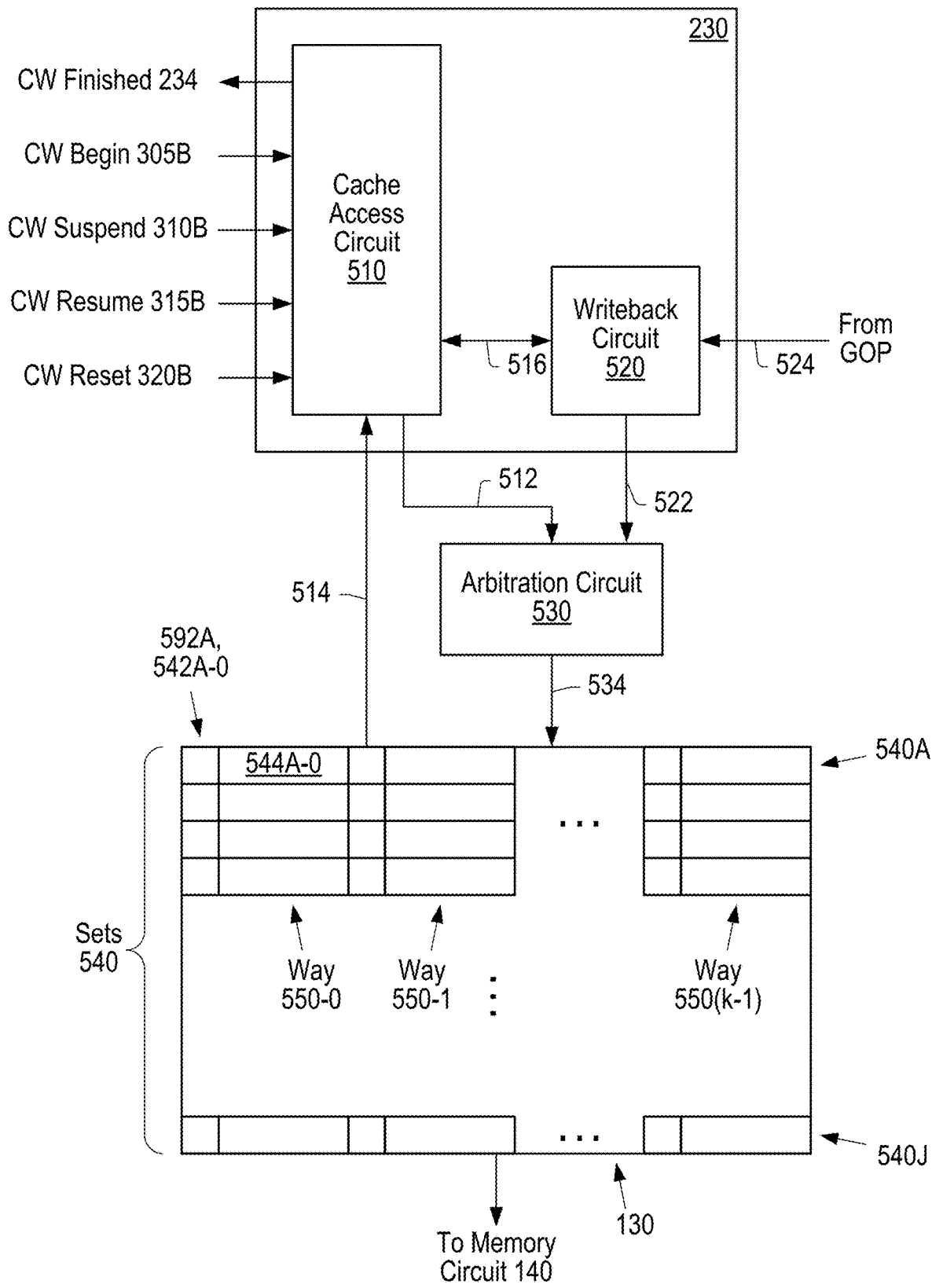
FIG. 5A is a block diagram of one embodiment of a cache walk circuit within a cache writeback circuit.

FIG. 5A is a block diagram illustrating interaction between cache walk circuit 230 (first depicted in FIG. 2) and memory cache circuit 130. As depicted, cache walk circuit 230 interfaces with arbitration circuit 530 for access to the data of memory cache circuit 130. Arbitration circuit 530 allows cache walk circuit 230 to contend with other entities (e.g., agent circuits) seeking access to memory cache circuit 130. As shown, writeback circuit 520 may be another entity competing with cache access circuit 510 for access to memory cache circuit 130.

Memory cache circuit 130 may be arranged in any suitable manner: direct mapped (data able to be placed only one place in the cache), fully associative (data able to be placed anywhere in the cache), and set associative (data able to be placed in a restricted set of places in the cache). FIG. 5A shows a set-associative arrangement, in which various sets 540 each have k ways, 550-0 to 550(k–1). Data for a particular access that maps to a particular set 540 thus resides (if it resides in the cache at all) in one of the k ways of that set. A given cache line (e.g., 544A-0) will have metadata such as a valid bit 592 and a dirty bit 542A. Valid bits for a particular set 540 might thus include valid bits 592A, 592B, 592C, etc., while dirty bits for the set might include dirty bits 544A-0, 544A-1, 544A-2, etc.

As shown, cache walk circuit 230, in one embodiment, includes cache access circuit 510 and writeback circuit 520. As will be described in more detail in FIG. 5B, cache access circuit 510 receives, from control circuit 210, cache walk commands 224, which include CW begin signal 305B, CW suspend signal 310B, CW resume signal 315B, and CW reset signal 320B. Cache access circuit 510 also outputs cache walk finished signal 234, which is conveyed to state transition detection circuit 220 as previously shown in FIG. 2.

When a cache walk is being performed, cache access circuit 510, in one embodiment, will make cache walk requests 512 to each cache line within memory cache circuit 130 to determine if that cache line is eligible for scrubbing. When a cache walk request 512 is selected by arbitration circuit 530, a cache request 534 will be sent, and return the contents of the requested cache line via return data 514. (Note that cache walk request 512 and return data 514 can be said to constitute interface 114 for cache address and data, as labeled in FIG. 1B.) Cache access circuit 510 is configured to analyze the data of the requested cache line (e.g., by looking at valid and dirty bits) to determine whether that cache line should be sent to writeback circuit 520 via writeback interface 516. The communication via interface 516 will typically include the address of the data to be written back to a lower level of memory. When a writeback is requested, writeback circuit 520 will generate writeback request 522, which will eventually be selected by arbitration circuit 530 and sent to the memory cache via cache request 534. This request will cause the indicated cache line to be written to a lower level of memory, as indicated by memory circuit 140 in FIG. 5A.

In one embodiment, cache walk circuit 230 may perform only a single writeback at a time. In such embodiments, writeback circuit 520 pauses until receiving a completion indication 524 from a global ordering point within the memory subsystem, which indicates when a write is sufficiently complete to be considered to be "committed" within the memory hierarchy. Once writeback circuit 520 receives a completion indication 524 for a particular writeback, writeback circuit sends an indication to cache access circuit 510 via interface 516, which permits the current cache walk to continue to the next cache line. (Note that, collectively, writeback request 522 and completion indication 524 can constitute writeback interface 118 depicted in FIG. 1B.)

Note that when cache access circuit 510 determines that the contents of a particular cache line are not eligible for scrubbing, cache access circuit 510 simply proceeds to access the next cache line—there is no need to interface with writeback circuit 520 for these cache lines.

Figure 5B:
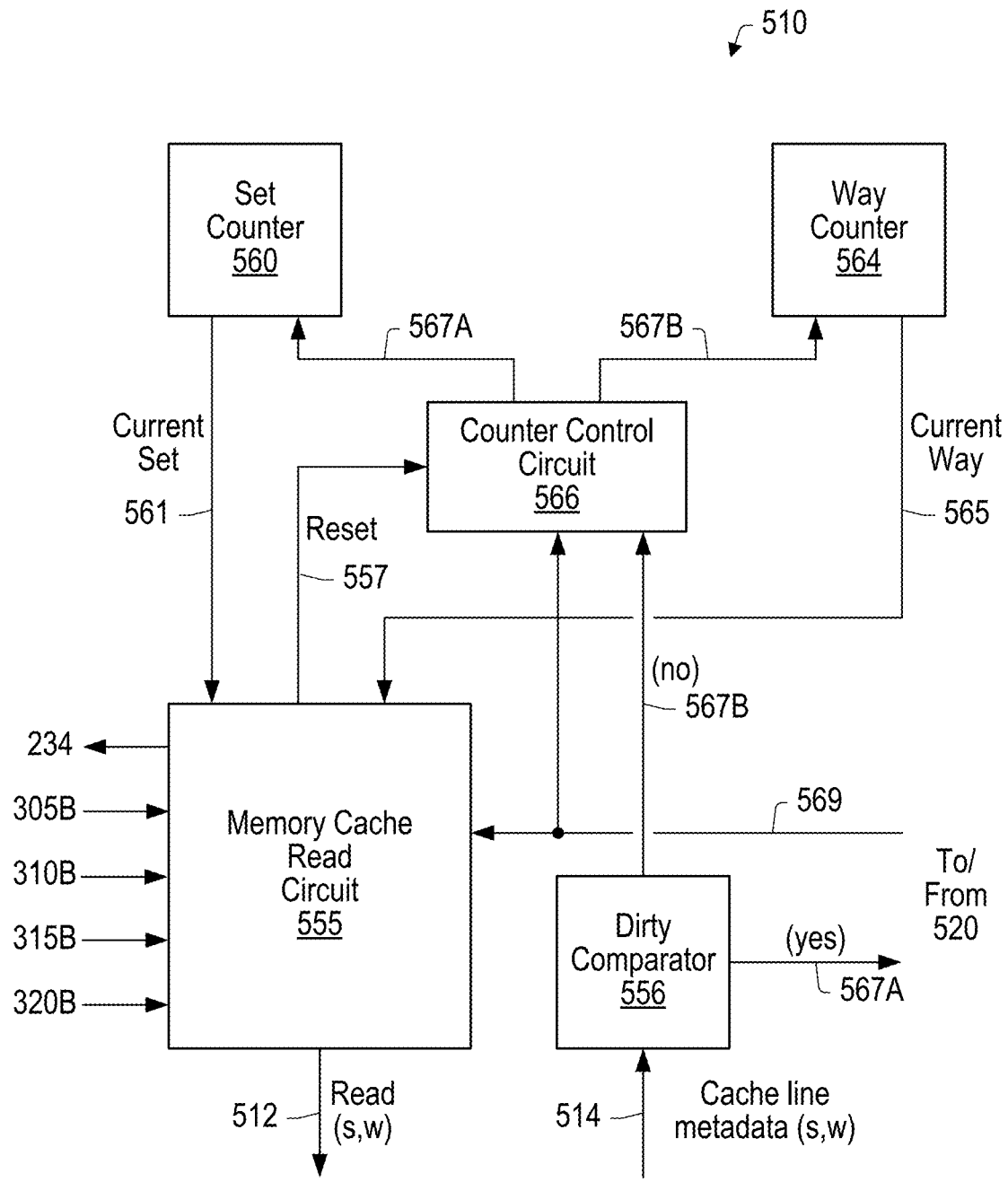
FIG. 5B is a block diagram of one embodiment of a cache access circuit within a cache walk circuit.

FIG. 5B is a block diagram of one embodiment of cache access circuit 510. As depicted, cache access circuit 510 includes memory cache read circuit 555, set counter circuit 560, way counter circuit 564, counter control circuit 566, and dirty comparator circuit 556. Note that the particular arrangement of cache access circuit 510 shown in FIG. 5B is for a set-associative memory cache circuit 130 such as that shown in FIG. 5A. Other arrangements of cache access circuit 510 are possible for other types of organizations of memory cache circuit 130.

A cache walk commences in response to receiving CW begin signal 305B, which causes memory cache read circuit 555 to begin a cache walk by generating a cache walk request 512 with initial values for set counter circuit 560 ($s$) and way counter circuit 564 ($w$) to generate a read access to memory cache circuit 130. In response, dirty comparator circuit 556 will receive the contents of the requested cache line as return data 514. Dirty comparator circuit 556 is configured to determine if the returned cache line's valid and dirty bits are set, as well as any other filtering criteria for determining scrubbing eligibility (as will be discussed with respect to FIG. 5E).

If the result of the comparison(s) performed by dirty comparator circuit 556 indicates scrubbing eligibility, scrubbing indication 567A is sent to writeback circuit 520 as part of interface 516. When the scrubbing operation has completed, writeback circuit 520 will send writeback complete signal 569 to memory cache read circuit 555 (as part of interface 516) and to counter control circuit 566. Counter control circuit 566, in response to receiving writeback complete signal 569, is configured to cause way counter circuit 564 and, if applicable, set counter circuit 560 to be incremented. For example, set counter circuit 560 and way counter circuit 564 may each be set to zero initially, with way counter circuit 564 being incremented after each cache line access until reaching the maximum way value, at which time set counter circuit 560 is incremented and way counter circuit 564 is reset to zero. This process continues, with memory cache read circuit 555 utilizing current set 561 and current way 565 to perform cache lines accesses until the cache walk is complete. Such (set, way) incrementing also occurs in response to signal 567B, which is asserted if the cache line returned in return data 514 is not eligible for scrubbing, as determined by dirty comparator circuit 556. When the cache walk is completed, memory cache read circuit 555 asserts cache walk finished signal 234, which indicates to state transition detection circuit 220 that state machine 330 implemented by control circuit 210 should transition to idle state 340.

When memory cache read circuit 555 receives CW suspend signal 310B, cache access circuit 510 is configured to pause, preserving the values of set counter circuit 560 and way counter circuit 564, until such time as CW resume signal 315B or CW reset signal 320B is received. In response to receiving CW resume signal 315B, cache access circuit 510 is configured to continue performing the cache walk with the preserved values of set counter circuit 560 and way counter circuit 564. In contrast, in response to receiving CW reset signal 320B, memory cache read circuit 555 is configured to assert reset signal 557 to counter control circuit 566, which in turn is configured to reset set counter circuit 560 and way counter circuit 564 to zero in preparation for a subsequent cache walk.

Figure 5C:
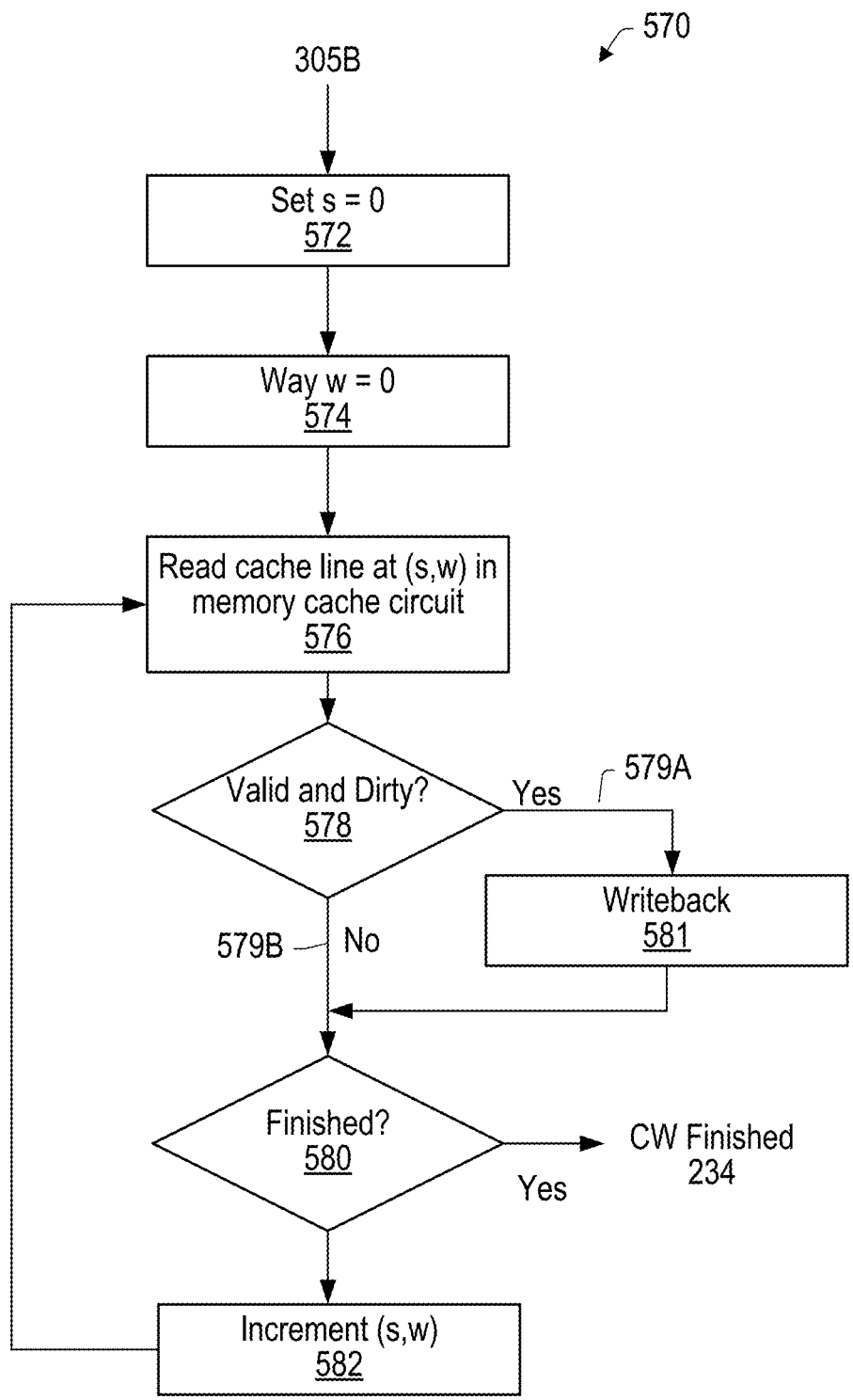
FIG. 5C is a flow diagram illustrating operation of one embodiment of a cache walk circuit.

FIG. 5C depicts one embodiment of a method 570 for performing a cache walk. Method 570 summarizes features performed by cache access circuit 510 described above with reference to FIG. 5B. Method 570 is thus specific to performing a cache walk for set associativity caches; caches; cache memory circuits with different organization would have equivalent variations of method 570.

Method 570 begins in 572, which may be performed in response to receiving CW begin signal 305B. A counter for the current set of the cache memory(s) is initialized to zero in 572, and the current way (w) is initialized to zero in 574. In 576, the cache line at (s,w) is retrieved from the cache. In 578, it is determined whether the cache line is valid and dirty. If so, method 570 proceeds via branch 579A to writeback 581, and from there to decision block 580, which determines whether the cache walk is complete. If the cache line is not valid and dirty, method 570 proceeds to decision block 580 via branch 579B.

If decision block 580 determines the cache walk is finished, cache walk finished signal 234 is asserted and method 570 exits. If the cache walk is not complete, the set and way counters are incremented in 582. For a cache memory circuit with j sets and k ways, the cache walk will proceed from (0,0) to (0, k−1), from (1,0) to (1, k−1) all the way to (j−1,0) to (j−1, k−1). Method 570 proceeds to 576 and continues until the cache walk is complete.

Figure 5D:
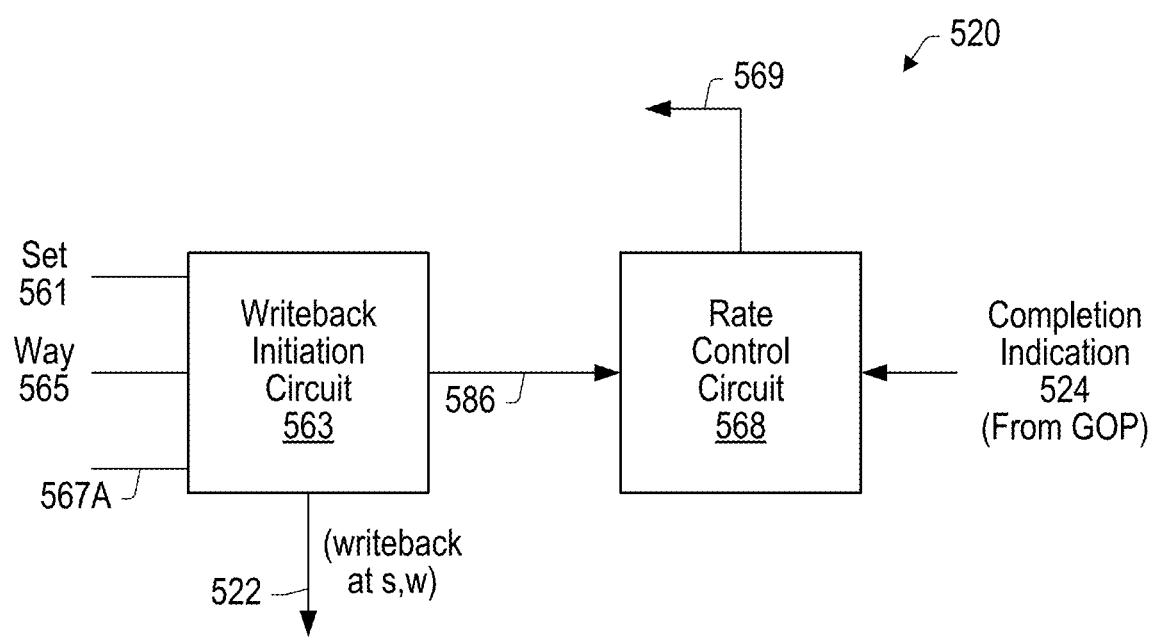
FIG. 5D is a block diagram of a writeback circuit within one embodiment of a cache walk circuit.

FIG. 5D is a block diagram of one embodiment of a writeback circuit 520 configured to perform a scrubbing operation. As shown, writeback circuit 520 includes writeback initiation circuit 563 and a rate control circuit 568.

Writeback initiation circuit 563 is configured to initiate writeback request 522 in response to receiving scrubbing indication 567A along with the current set 561 (s) and the current way 565 (w). Writeback request 522 causes the cache line data at (s,w) to be written back to a lower level of memory, but without invalidating that cache line. Accordingly, a cache line being scrubbed will transition from having its valid and dirty bits both being set to having its valid bit set but its dirty bit reset. When writeback request 522 is initiated, writeback pending signal 586 is sent to rate control circuit 568.

Rate control circuit 568 is configured to control the rate of scrubbing operations being performed on memory cache circuit 130. It may be desirable, for example, to not unduly burden memory cache circuit 130 with scrubbing requests. For this reason, in the depicted embodiment, writeback circuit 520 is configured to permit only one writeback at a time. Accordingly, when rate control circuit 568 receives writeback pending signal 586, it will wait for completion indication 524 (received from a system global ordering point as previously described in one embodiment). Once completion indication 524 is received, rate control circuit 568 will initiate writeback complete signal 569, which indicates to cache access circuit 510 that the cache walk can continue. Rate control circuit 568 may also be configured to wait some amount of time before initiating writeback complete signal 569. Accordingly, rate control circuit 568 can control the rate of operation of cache writeback circuit by 1) controlling the number of writebacks that are pending at a given time and/or 2) inserting a delay between writebacks. These two methods of rate control can thus be used in the alternative or together.

Note that in other embodiments, rate control circuit 568 may not exist or could be configured differently (e.g., permit two pending scrubbing operations).

Figure 5E:
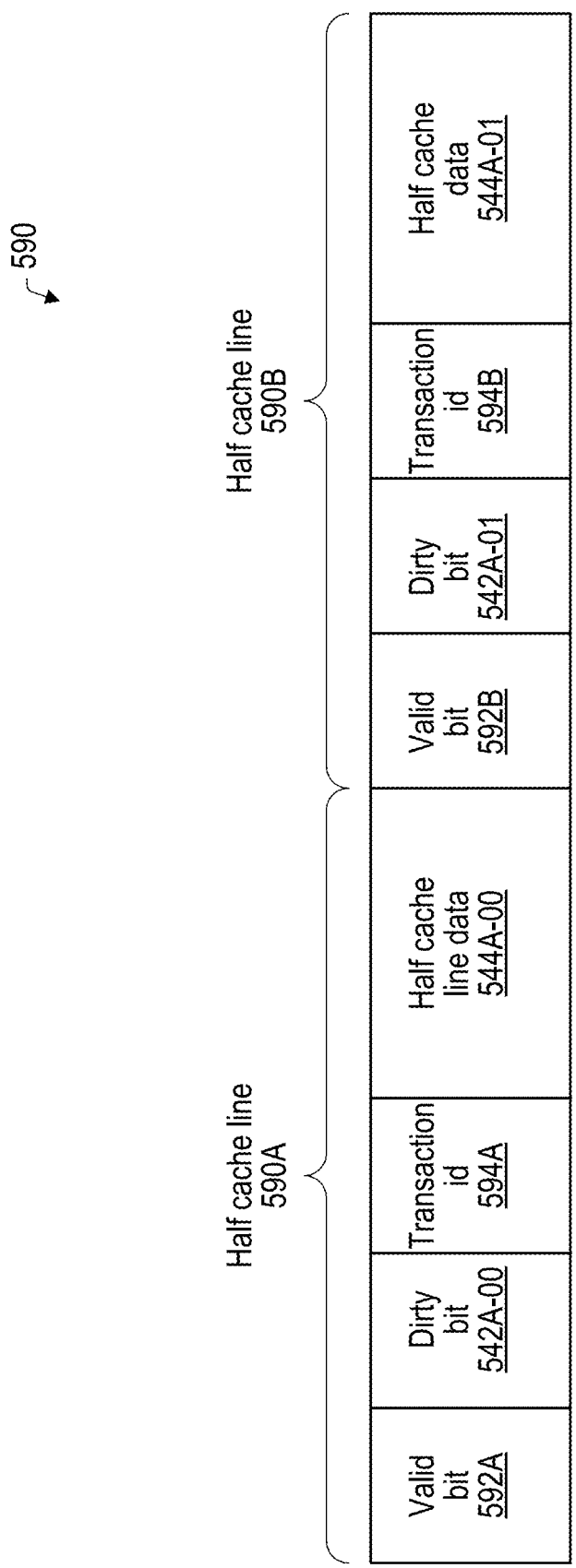
FIG. 5E is a diagram showing one example of a layout of a cache line that includes half cache lines.

Turning now to FIG. 5E, an example of a cache line 590 within memory cache circuit 130 is illustrated. In the illustrated embodiment, cache line 590 is comprised of two half cache lines 590A-B, but in other embodiments, cache line 590 may include a single, "full" cache line. As shown, a given half cache line (HCL) includes half cache line data (544A-00 or 544A-01) as well as associated metadata. Each HCL includes, for example, a valid bit 592, a dirty bit 542A, and a transaction identifier 594.

In some implementations, data 544A in both halves of cache line 590 must be valid and dirty (i.e., both valid bits 592A-B and dirty bits 542A-00 and 542A-01 must be set) in order for cache line 590 to be written back to a lower level of the memory hierarchy. In such embodiments, dirty comparator circuit 556 will operate on a pair of dirty bits per cache line. In other embodiments, cache access circuit 510 is configured to operate on a half-cache-line basis, and thus may be configured write back at an HCL granularity (e.g., HCL data 544A-00 but not 544AA-01), in which case dirty comparator circuit 556 operates only a single dirty bit per HCL. One motivation for scrubbing only those cache lines in which both halves are dirty is the intuition that cache lines that have half-dirty data will likely have the other half written with dirty data in short order. Accordingly, scrubbing of half-dirty cache lines would result in premature scrubbing; it can thus be more efficient to wait until the line is completely dirty.

Valid bits 592 and dirty bits 542A are examples of cache line metadata, which is data about HCL data 544A. Another possible example of cache line metadata is a transaction identifier such as transaction id 594A or 594B. Various memory operations within computer system 100 may be identified, in some embodiments, as belonging to distinct data streams. Such streams may be given a transaction id 594 when written to memory cache circuit 130. A given agent circuit within computer system 100 may have multiple streams with different transaction ids active at a given time. Conversely, a stream with a particular transaction id may be used by multiple agent circuits.

Cache writeback circuit 110 may be configured in some cases to cause cache lines with certain transaction ids to be written back to memory while not causing cache lines with other transaction ids to be written back, thus introducing selectivity in the scrubbing process. In various cases, computer system 100 will at times include information (an optional "switch") indicating that certain data streams are not likely to be written back to a lower level of the memory hierarchy. Cache writeback circuit 110 may thus be passed such information (which may have originated from an operating system of computer system 100), which allows the cache walk performed by cache writeback circuit 110 to be more selective in terms of which cache lines (or HCLs) are scrubbed.

Cache writeback circuit 110 can thus be programmed with an optional switch in some embodiments (the switch can be specified by assertion of a signal or by a data value in various implementations). This switch allows specification of the type of content to be scrubbed by indicating, for example, which stream a cache line belongs to. In other embodiments, the switch might indicate the identity or type of source agent circuit that originally wrote the data to memory cache circuit 130. (In some cases, a processor circuit might not be a good candidate for scrubbing; but some other agent circuits such as GPUs might be.) In embodiments with selective scrubbing, there will be metadata in various cache lines that allows cache writeback circuit 110 to identify data indicated by the optional switch. Thus, an instruction to cache writeback circuit 110 that specifies scrubbing of data only from GPU0 will cause cache writeback circuit 110 to interrogate cache lines in memory cache circuit 130 during the cache walk to find only those dirty cache lines in the cache originating from GPU0.

In such embodiments, the method illustrated in FIG. 5C could be modified at 574 to also retrieve the transaction id 594 from the cache line unit (HCL or full cache line) being operated on. In 576, the decision could be expanded to require that the retrieved transaction id need match filter criteria passed to cache writeback circuit 110. Under such an altered method, only those cache lines that are valid, dirty, and match a set of transaction identifiers would be eligible for scrubbing. In this manner, use of transaction identifiers allows cache writeback circuit 110 to skip writeback of certain dirty cache lines while performing a cache walk.

In some cases, software executing on computer system 100 may decide to drop a particular data stream, meaning that all the data for that stream in memory cache circuit 130 is to be discarded without writing it back to a lower level of memory. This may be performed in some instances by a so-called "sideband drop" operation in which memory cache circuit 130 receives a message to the cache to drop all of the addresses of a particular data stream, as specified by a particular transaction identifier. In response, memory cache circuit 130 performs its own cache walk, and upon finding cache line units (full or half cache lines) with the specified transaction identifier, drops them one by one.

In one embodiment, when cache writeback circuit 110 is performing a cache walk and receives information that a sideband drop is occurring, it discontinues the cache walk and resets. The discontinuation of the scrubbing cache walk allows a different cache walk to be performed by memory cache circuit 130 to drop the specified cache lines (cache writeback circuit 110 is not involved in this cache walk). Memory cache circuit's 130 cache walk, in one embodiment, invalidates any cache line units that match the specified transaction identifier; the invalidated data is not written back to a lower level of memory since software has identified that data stream as no longer useful. Cache line units invalidated in this manner are thus not eligible for subsequent scrubbing.

Cache line data being cached in memory cache circuit 130 may arrive with "anti-hint" data indicating that the cache line should not be scrubbed, even if the cache line includes dirty data, meets any filters such as transaction id, etc. Accordingly, anti-scrubbing metadata may be interrogated during a cache walk and can override what would otherwise be a determination to scrub.

Figure 6:
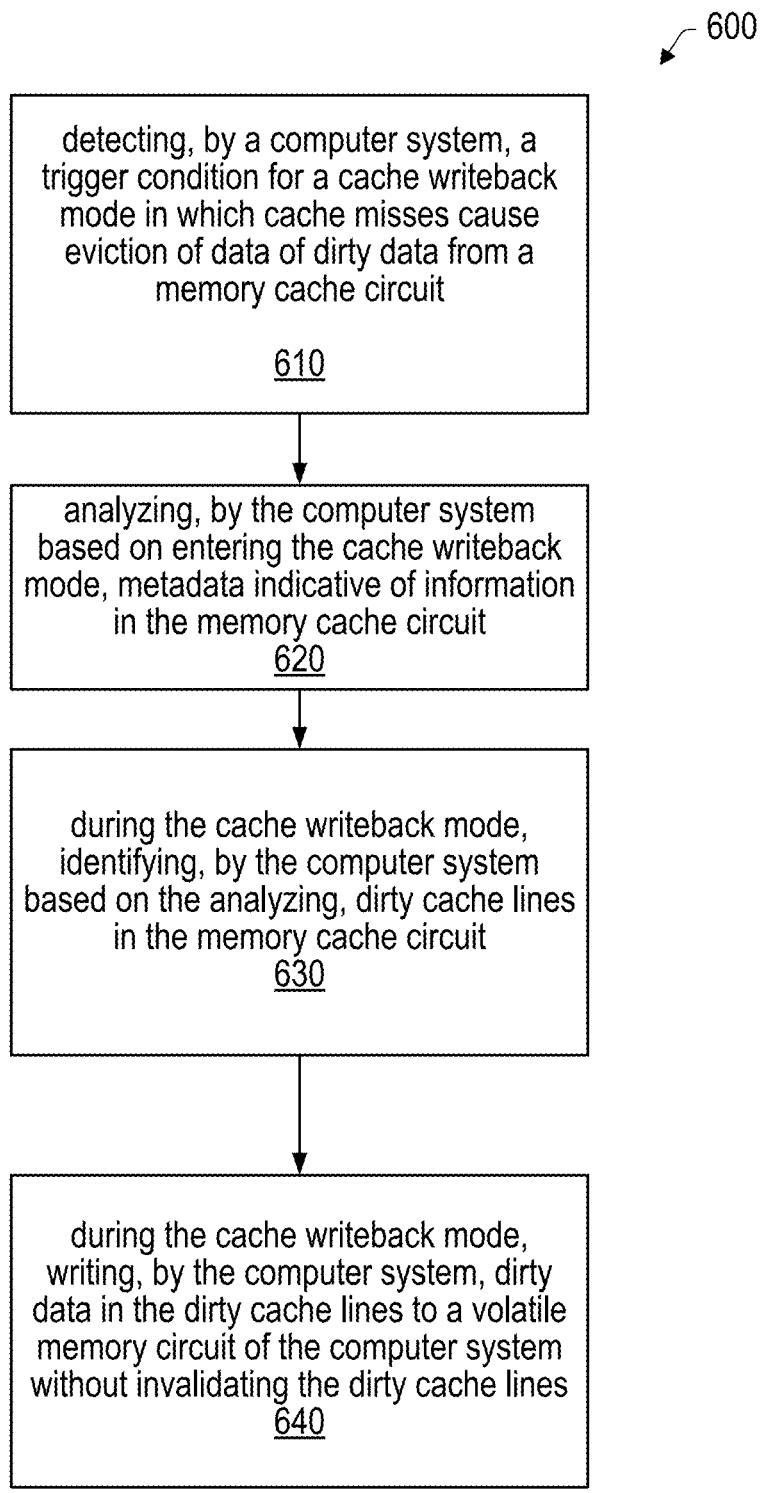
FIG. 6 is a flow diagram of one embodiment of a method for writing back, without invalidating, dirty data from a memory cache circuit.

FIG. 6 is a flow diagram of one embodiment of a method 600 for implementing a cache writeback mode. Method 600 is written from the perspective of a computer system that includes a memory cache circuit. Exemplary reference numerals to previously described structure and elements are provided for convenience within parentheticals in the following description of method 600. Such reference numerals, however, are not intended to unduly limit the scope of this method.

Method 600 begins, in 610, in which a computer system (100) detects a trigger condition (305A) for a cache writeback mode in which cache misses cause eviction of data of dirty data from a memory cache circuit (130). Detecting the trigger condition may take various forms as described herein. For example, detecting the trigger condition may include identifying a particular time window within two or more previous time windows when a threshold amount of cache miss bandwidth between the memory cache circuit and the volatile memory satisfies a cache miss bandwidth threshold. (e.g., bandwidth threshold satisfied in at least 2 of 5 last 20 μs windows by circuit 410). Additionally or alternatively, detecting the trigger condition may include identifying when a threshold amount of cache line eviction occurs during the particular time window (by circuit 414). Still further, detecting the trigger condition may include determining that a performance state of the volatile memory satisfies a performance state threshold (by circuit 426). As noted, it may not make sense to enter the cache writeback mode if the memory circuit is in a relatively low-performance state.

Method 600 continues in 620, in which the computer system analyzes, based on entering the memory cache writeback mode, metadata indicative of information in the memory cache circuit (e.g., cache line dirty bits). During the cache writeback mode, the computer system, in 630, identifies, based on the analyzing, dirty cache lines in the memory cache circuit, and, in 640, writes dirty data in the dirty cache lines to volatile memory of the computer system without invalidating the dirty cache lines.

The cache writeback mode may have various exit conditions in different embodiments. For example, method 600 may include the cache writeback mode being exited in response to completing a cache walk in which all dirty cache lines are identified and written to volatile memory. Method 600 may also include the cache writeback mode being exited in response to a flush or disabling of the memory cache circuit.

The cache writeback mode may also be suspended and resumed in response to different conditions. For example, method 600 may include suspending the cache writeback mode based on detection of a suspend condition in which an insufficient amount of bandwidth is available to write back cache lines to the volatile memory or the memory cache circuit receiving a higher-priority memory cache operation. Method 600 may also include resuming the cache writeback mode based on the suspend condition no longer being true.

Example Device

Figure 7:
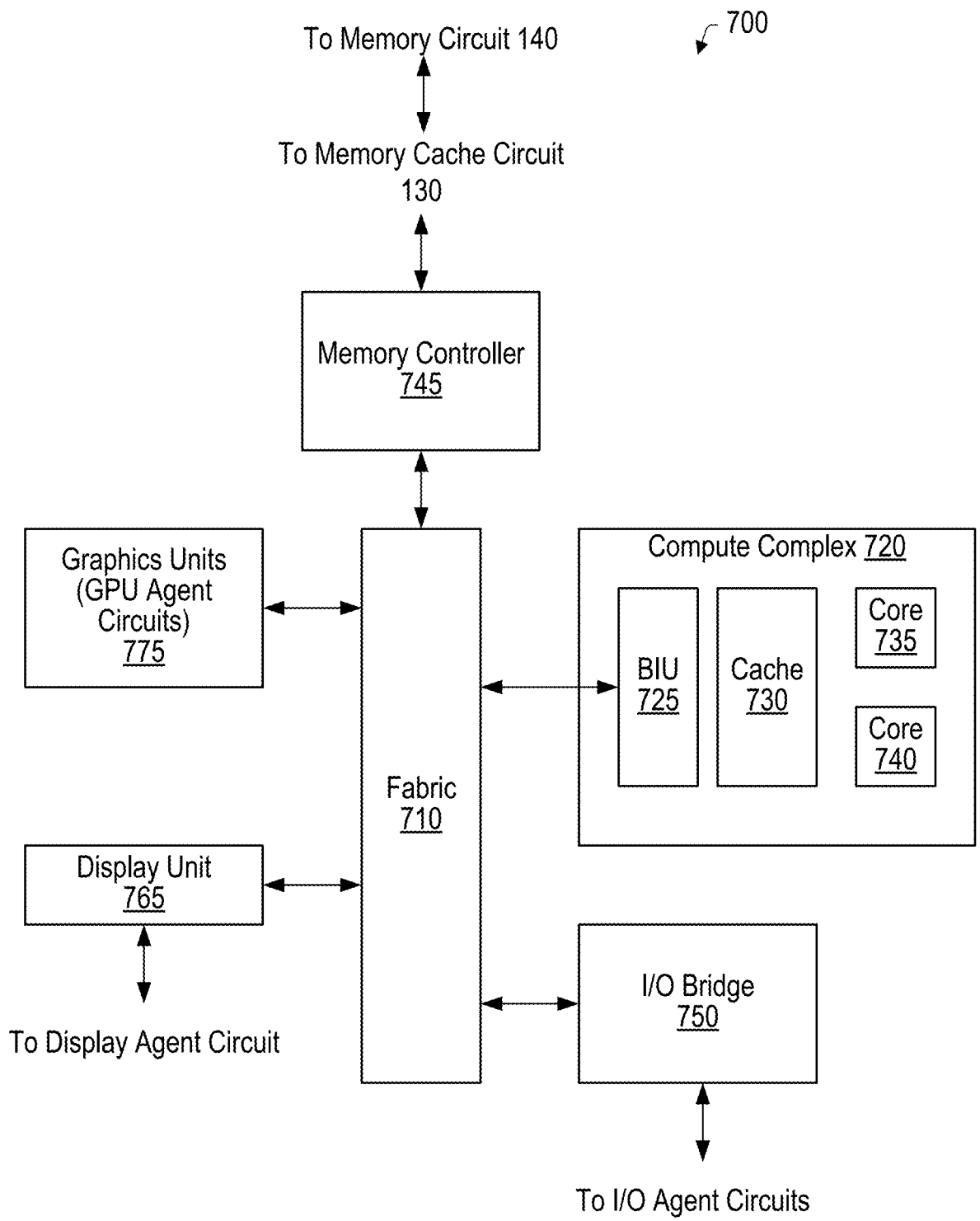
FIG. 7 is a block diagram of one embodiment of a computer system.

Referring now to FIG. 7, a block diagram illustrating an example embodiment of a device 700 is shown. In some embodiments, elements of device 700 may be included within a system on a chip or distributed on multiple co-packaged integrated circuits as part of a chiplet architecture. In some embodiments, device 700 may be included in a mobile device, which may be battery powered. Therefore, power consumption by device 700 may be an important design consideration. In the illustrated embodiment, device 700 includes fabric 710, compute complex 720 input/output (I/O) bridge 750, memory controller 745, graphics unit 775, and display unit 765. In some embodiments, device 700 may include other components (not shown) in addition to or in place of the illustrated components, such as video processor encoders and decoders, image processing or recognition elements, computer vision elements, etc.

In one embodiment, the cache writeback circuit described above may be located within memory controller 745. In such an embodiment, the apparatus shown in FIG. 7 can be considered to depict a computer system formed on one or more integrated circuits. The computer system includes a memory subsystem that includes a memory hierarchy with a memory cache circuit (130) at a first level of the memory hierarchy and a memory circuit (140; e.g., a volatile memory circuit) at a second, lower level of the memory hierarchy.

Additionally, the computer system includes a plurality of agent circuits configured to access the memory subsystem. Examples of these plurality of agent circuits include processor agent circuits (e.g., cores 735, 740), memory controller agent circuits (e.g., memory controller 745), as well as other agent circuits (display agent circuit, other I/O agent circuits, as well as SoC agent circuits). More information about agent circuits is included below in the section entitled "Agent Circuits."

The computer system further includes a cache writeback circuit configured to enter a cache writeback mode based on detection of read accesses from the plurality of agent circuits to the memory cache circuit that cause dirty data from the memory cache circuit to be written to volatile memory. The cache writeback circuit is further configured, in the cache writeback mode, perform a cache walk of the memory cache circuit to identify dirty cache lines and write, without invalidating, the dirty cache lines from the memory cache circuit to the volatile memory circuit.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and caches. For example, compute complex 720 may include 1, 2, or 4 processor cores, or any other suitable number. In one embodiment, cache 730 is a set associative L2 cache. In some embodiments, cores 735 and 740 may include internal instruction and data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions. These instructions may be stored in computer readable medium such as a memory coupled to memory controller 745 discussed below.

As used herein, the term "coupled to" may indicate one or more connections between elements, and a coupling may include intervening elements. For example, in FIG. 7, graphics unit 775 may be described as "coupled to" a memory through fabric 710 and memory controller 745. In contrast, in the illustrated embodiment of FIG. 7, graphics unit 775 is "directly coupled" to fabric 710 because there are no intervening elements.

Memory controller 745 may be configured to manage transfer of data between fabric 710 and one or more caches and memories, such as memory cache circuit 130. In one embodiment, cache writeback circuit 110 may be located within memory controller 745. In various embodiments, memory controller 745 may be coupled to an L3 cache (e.g., memory cache circuit 130, in some embodiments), which may in turn be coupled to a system memory (memory circuit 140 in some embodiments). In other embodiments, memory controller 745 may be directly coupled to a memory. In some embodiments, memory controller 745 may include one or more internal caches. Memory coupled to memory controller 745 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to memory controller 745 may also be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 720 to cause the computing device to perform functionality described herein.

Graphics unit 775 may include one or more processors, e.g., one or more graphics processing units (GPUs). Graphics unit 775 may receive graphics-oriented instructions, such as OPENGL®, Metal®, or DIRECT3D® instructions, for example. Graphics unit 775 may execute specialized GPU instructions or perform other operations based on the received graphics-oriented instructions. Graphics unit 775 may generally be configured to process large blocks of data in parallel and may build images in a frame buffer for output to a display, which may be included in the device or may be a separate device. Graphics unit 775 may include transform, lighting, triangle, and rendering engines in one or more graphics processing pipelines. Graphics unit 775 may output pixel information for display images. Graphics unit 775, in various embodiments, may include programmable shader circuitry which may include highly parallel execution cores configured to execute graphics programs, which may include pixel tasks, vertex tasks, and compute tasks (which may or may not be graphics-related).

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and low-power always-on functionality, for example. I/O bridge 750 may also include interfaces such as pulse-width modulation (PWM), general-purpose input/output (GPIO), serial peripheral interface (SPI), and inter-integrated circuit (I2C), for example. Various types of peripherals and devices may be coupled to device 700 via I/O bridge 750.

In some embodiments, device 700 includes network interface circuitry (not explicitly shown), which may be connected to fabric 710 or I/O bridge 750. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 700 with connectivity to various types of other devices and networks.

Agent Circuits

Agent circuits are circuits that implement functionality for agents within computer system such as that shown in FIG. 7. As used herein, an agent is any component or device (e.g., processor, peripheral, memory controller, etc.) that sources and/or sinks communications on one or more of networks (e.g., fabric 710). A source agent circuit generates (sources) a communication, and a destination agent circuit receives (sinks) the communication. A given agent circuit may be a source agent for some communications and a destination agent for other communications.

As used herein, a "processor circuit" refers to any type of central processing unit (CPU). A given processor circuit can include multiple CPUs. For example, one implementation might include a single component with one processing element (i.e., one processor core). Another implementation might include a single component with multiple processor cores (e.g., cores 735 and 740). Yet another implementation might include a processor cluster with multiple components, each of which may include multiple processor cores.

"Memory controllers," on the other hand refer to any circuit that interfaces to system memory, which includes DRAM. Some embodiments of memory controllers may include memory caches, while others may not. Agent circuits shown in FIG. 7, for example, are able to access memory controller 745 using fabric 710.

In one embodiment, components such as display unit 765 or those coupled to fabric 710 via I/O bridge 750 may be referred to as SoC agents. Some of these SoC agents may also be considered to be input/output (I/O) devices or I/O agents, a broad category that can include an internal or external display, one or more cameras (including associated image signal processor circuits), a Smart IO circuit, and interfaces to various buses such as USB and PCIe. Such circuits can thus be considered to be both SoC agents and I/O agent circuits, where I/O agent circuits are a subset of SoC agents. Other types of SoC agent circuits are possible, including a secure enclave processor, a neural processing engine, JPEG codec circuits, video encoding/decoding circuits, a power manager circuit, an always-on (AON) circuit, etc. Such circuits may thus be SoC agent circuits but not I/O agent circuits.

GPUs such as graphics unit 775 are another type of agent circuit. In some embodiments, GPUs may also be connected to agent circuits acting as memory controllers, allowing GPUs to access system memory via fabric 710.

Example Applications

Figure 8:
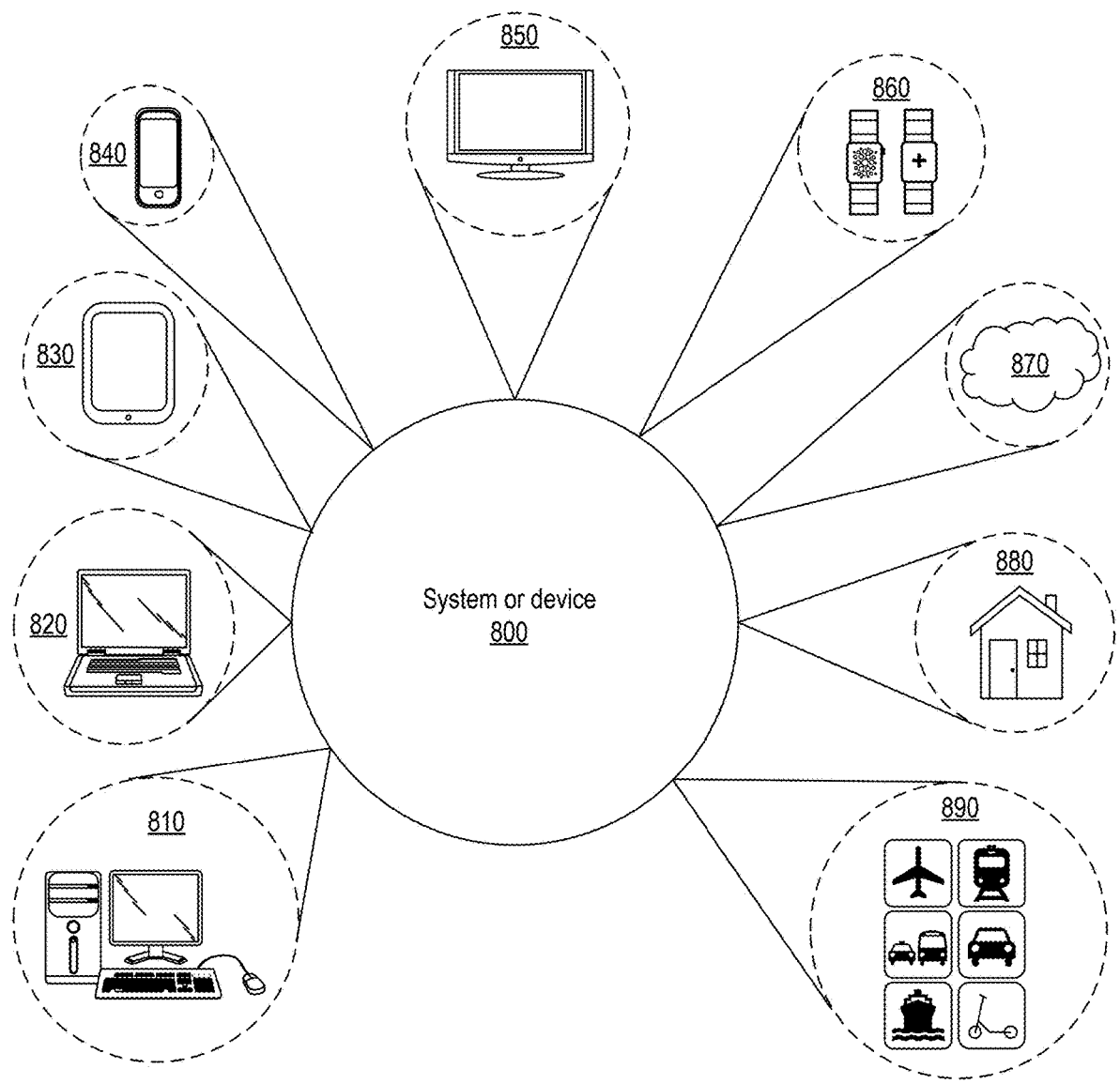
FIG. 8 is a diagram illustrating example applications for systems and devices employing the disclosed techniques.

Turning now to FIG. 8, various types of systems that may include any of the circuits, devices, or system discussed above. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 9:
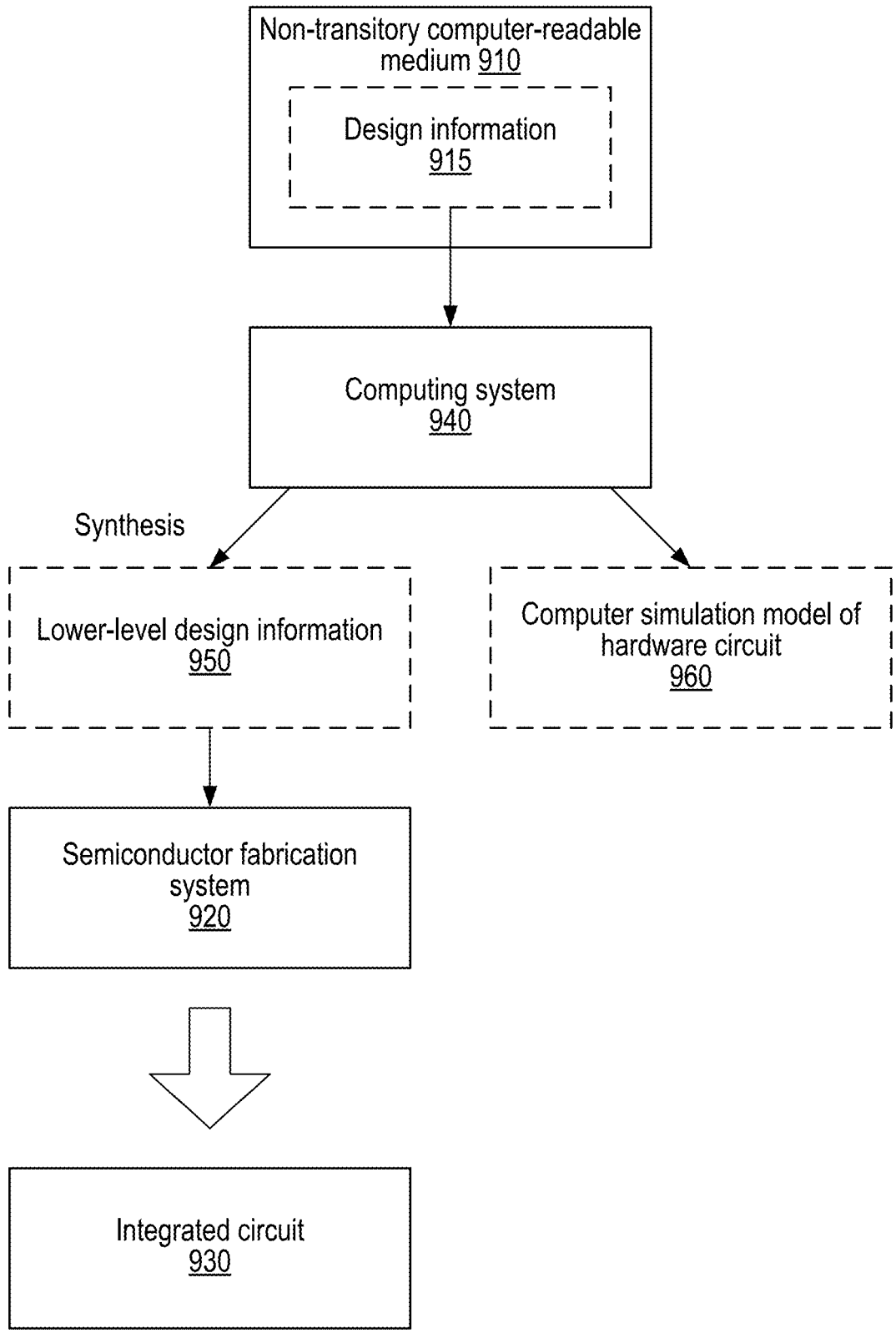
FIG. 9 is a block diagram illustrating an example computer-readable medium that stores circuit design information for implementing devices that employ the disclosed techniques.

FIG. 9 is a block diagram illustrating an example non-transitory computer-readable storage medium that stores circuit design information, according to some embodiments. In the illustrated embodiment, computing system 940 is configured to process the design information. This may include executing instructions included in the design information, interpreting instructions included in the design information, compiling, transforming, or otherwise updating the design information, etc. Therefore, the design information controls computing system 940 (e.g., by programming computing system 940) to perform various operations discussed below, in some embodiments.

In the illustrated example, computing system 940 processes the design information to generate both a computer simulation model of a hardware circuit 960 and lower-level design information 950. In other embodiments, computing system 940 may generate only one of these outputs, may generate other outputs based on the design information, or both. Regarding the computing simulation, computing system 940 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 940 also processes the design information to generate lower-level design information 950 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 950 (potentially among other inputs), semiconductor fabrication system 920 is configured to fabricate an integrated circuit 930 (which may correspond to functionality of the simulation model 960). Note that computing system 940 may generate different simulation models based on design information at various levels of description, including information 950, 915, and so on. The data representing design information 950 and model 960 may be stored on medium 910 or on one or more other media.

In some embodiments, the lower-level design information 950 controls (e.g., programs) the semiconductor fabrication system 920 to fabricate the integrated circuit 930. Thus, when processed by the fabrication system, the design information may program the fabrication system to fabricate a circuit that includes various circuitry disclosed herein.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Accordingly, non-transitory computer-readable storage medium 910 may include two or more memory media; such media may reside in different locations—for example, in different computer systems that are connected over a network.

Design information 915 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 940, semiconductor fabrication system 920, or both. In some embodiments, design information may also include one or more cell libraries that specify the synthesis, layout, or both of integrated circuit 930. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 930 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 and model 960 are configured to operate according to a circuit design specified by design information 915, which may include performing any of the functionality described herein. For example, integrated circuit 930 may include any of various elements shown in FIGS. 1-5. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 920 to fabricate integrated circuit 930.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation-[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom-designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
    a computer system formed on one or more integrated circuits that includes:
        a memory subsystem that includes a memory hierarchy with a memory cache circuit at a first level of the memory hierarchy and a volatile memory circuit at a second, lower level of the memory hierarchy;
        a plurality of agent circuits configured to access the memory subsystem;
        a cache writeback circuit configured to:
            enter a cache writeback mode based on detection of read accesses from the plurality of agent circuits to the memory cache circuit that cause dirty data from the memory cache circuit to be written to the volatile memory circuit; and
            in the cache writeback mode, perform a cache walk of the memory cache circuit to identify dirty cache lines and write, without invalidating, the dirty cache lines from the memory cache circuit to the volatile memory circuit.

2. The apparatus of claim 1, wherein, to detect accesses from the plurality of agent circuits to the memory cache circuit that cause dirty data from the memory cache circuit to be written to the volatile memory circuit, the cache writeback circuit is configured to:
    identify a particular time window in which a threshold amount of accesses to the volatile memory circuit occurs within a previous set of N time windows; and
    identify an occurrence of a threshold amount of cache line eviction to the volatile memory circuit during the particular time window.

3. The apparatus of claim 1, wherein the cache writeback circuit is further configured to enter the cache writeback mode based on:
    a threshold number of dirty cache lines being present in the memory cache circuit;
    a current performance state for the volatile memory circuit satisfying a threshold performance state; and
    sufficient bandwidth to the volatile memory circuit being available to perform writebacks.

4. The apparatus of claim 1, wherein the cache writeback circuit is configured, during the cache writeback mode, to identify and writeback, without invalidating, only those dirty cache lines in the memory cache circuit that match certain parameters specified for the cache walk.

5. An apparatus, comprising:
    a cache writeback circuit configured to:
        enter an active state based on detecting a trigger condition indicative of cache misses to a memory cache circuit within a memory hierarchy of a computer memory subsystem causing:
            accesses to a memory circuit within a lower level of the memory hierarchy; and
            cache line eviction;
        during the active state:
            identify a set of dirty cache lines in the memory cache circuit; and
            write back, without invalidating, cache lines of the identified set of dirty cache lines from the memory cache circuit to the memory circuit.

6. The apparatus of claim 5, wherein the memory circuit is a volatile memory circuit.

7. The apparatus of claim 5, wherein the memory cache circuit includes a plurality of cache lines;
    wherein to identify the set of dirty cache lines, the cache writeback circuit is configured to perform a cache walk to read cache dirty bits for the plurality of cache lines; and
    wherein the cache writeback circuit is configured to exit the active state after completing the cache walk.

8. The apparatus of claim 7, wherein the plurality of cache lines are organized as a plurality of ways within a plurality of sets, and wherein, to perform the cache walk, the cache writeback circuit is configured to:
    read a particular cache dirty bit for a particular cache line corresponding to an initial way of the plurality of ways within an initial set of the plurality of sets;
    based on the particular cache dirty bit being set:
        initiate a writeback of the particular cache line to the memory circuit without invalidating the particular cache line; and wait until the writeback is committed before continuing the cache walk;
continue the cache walk for remaining ones of the plurality of ways of the initial set; and
continue the cache walk for remaining ones of the plurality of sets.

9. The apparatus of claim 5, wherein, during the active state, the cache writeback circuit is configured to identify only those dirty cache lines having data written by a set of data streams specified by a corresponding set of transaction identifiers.

10. The apparatus of claim 5, wherein the cache writeback circuit is configured to:
suspend the active state based on detection of a suspend condition in which a) an insufficient amount of bandwidth is available to write to the memory circuit or b) the memory cache circuit receives a higher-priority memory cache operation; and
resume the active state based on the suspend condition no longer being true.

11. The apparatus of claim 5, wherein the trigger condition is also based on a threshold number of dirty cache lines being present in the memory cache circuit.

12. The apparatus of claim 5, wherein the trigger condition is also based on a current performance state for the memory circuit satisfying a threshold performance state, and wherein the cache writeback circuit is configured to exit the active state based on the current performance state no longer satisfying the threshold performance state.

13. The apparatus of claim 5, wherein a trigger detection circuit within the cache writeback circuit is configured to detect the trigger condition indicative of contention between cache misses and write evictions, and wherein to detect the trigger condition, the trigger detection circuit is configured to:
identify a particular time window when a threshold amount of cache miss activity to the memory circuit occurs within a previous set of N time windows; and
identify when a threshold amount of cache line eviction occurs during the particular time window.

14. The apparatus of claim 5, wherein the cache writeback circuit is configured to not detect the trigger condition in response to an indication of a software instruction anti-hint in a particular dirty cache line, in spite of the particular dirty cache line being otherwise eligible for scrubbing.

15. A method, comprising:
detecting, by a computer system, a trigger condition for a cache writeback mode in which cache misses cause eviction of data of dirty data from a memory cache circuit;
analyzing, by the computer system based on entering the cache writeback mode, metadata indicative of information in the memory cache circuit;
during the cache writeback mode:
identifying, by the computer system based on the analyzing, dirty cache lines in the memory cache circuit; and
writing, by the computer system, dirty data in the dirty cache lines to a volatile memory circuit of the computer system without invalidating the dirty cache lines.

16. The method of claim 15, wherein detecting the trigger condition includes:
identifying a particular time window within two or more previous time windows when a threshold amount of cache miss bandwidth between the memory cache circuit and the volatile memory circuit satisfies a cache miss bandwidth threshold; and
identifying when a threshold amount of cache line eviction occurs during the particular time window.

17. The method of claim 15, wherein detecting the trigger condition further includes determining that a performance state of the volatile memory circuit satisfies a performance state threshold.

18. The method of claim 15, further comprising exiting the cache writeback mode in response to completing a cache walk in which all dirty cache lines are identified and written to the volatile memory circuit.

19. The method of claim 15, further comprising exiting the cache writeback mode in response to a flush or disabling of the memory cache circuit.

20. The method of claim 15, further comprising:
suspending the cache writeback mode based on detection of a suspend condition in which the memory cache circuit receives a higher-priority memory cache operation; and
resuming the cache writeback mode based on the suspend condition no longer being true.

* * * * *